(12) United States Patent
Park

(10) Patent No.: US 12,458,205 B2
(45) Date of Patent: Nov. 4, 2025

(54) DISH WASHER HAVING A KNIFE RACK

(71) Applicant: LG ELECTRONICS INC., Seoul (KR)

(72) Inventor: Dong Hwi Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/761,448

(22) Filed: Jul. 2, 2024

(65) Prior Publication Data
US 2025/0017440 A1 Jan. 16, 2025

(30) Foreign Application Priority Data
Jul. 14, 2023 (KR) .......................... 10-2023-0091525

(51) Int. Cl.
*A47L 15/50* (2006.01)
(52) U.S. Cl.
CPC ........... *A47L 15/505* (2013.01); *A47L 15/502* (2013.01)
(58) Field of Classification Search
CPC ................. A47L 15/505; A47L 15/502; A47F 2001/103; A47G 21/14; A47G 29/087; A47J 47/16
USPC ................. 211/41.9, 70.7; 248/37.3; 206/553
See application file for complete search history.

(56) References Cited

U.S. PATENT DOCUMENTS

| | | | | |
|---|---|---|---|---|
| 4,318,478 A | * | 3/1982 | De Winter | A47J 47/16 206/553 |
| 5,454,534 A | * | 10/1995 | Baskas | B26B 5/00 248/176.1 |
| 5,918,749 A | * | 7/1999 | Pille | A47L 15/505 211/41.9 |
| 6,564,685 B1 | * | 5/2003 | Beaton | B26D 1/30 83/609 |
| 7,210,588 B1 | * | 5/2007 | Ayon | A47G 21/14 211/70.7 |
| 7,441,659 B2 | * | 10/2008 | Nelson | A47G 21/14 248/37.3 |
| 7,478,642 B2 | * | 1/2009 | Koch | A47L 15/505 211/41.9 |
| 7,775,380 B2 | * | 8/2010 | Yang | A47J 47/20 211/41.9 |

(Continued)

FOREIGN PATENT DOCUMENTS

| | | | | |
|---|---|---|---|---|
| CA | 2070020 A | * | 6/1993 | ........... A47L 15/502 |
| CN | 213821302 U | * | 7/2021 | |

(Continued)

OTHER PUBLICATIONS

European Search Report issued in Application No. 24185008.0 dated Nov. 21, 2024.

*Primary Examiner* — Jennifer E. Novosad
(74) *Attorney, Agent, or Firm* — KED & ASSOCIATES, LLP

(57) ABSTRACT

A dish washer having a knife rack in which a first slot and a second slot that guide movement of a blade portion of a knife are defined at an entrance to a receiving space of the blade portion as defined by a first main body and a second main body of the knife rack, and are spaced from each other along a longitudinal direction of the blade portion, such that when the blade portion is input into the receiving space, a front end of the blade portion is prevented from contacting the first main body and the second main body.

19 Claims, 25 Drawing Sheets

(56) References Cited

U.S. PATENT DOCUMENTS

| | | | |
|---|---|---|---|
| 7,802,688 B1* | 9/2010 | Ruan | A47J 47/16 |
| | | | 248/37.3 |
| 8,727,142 B2* | 5/2014 | Shapiro | A47B 97/00 |
| | | | 248/37.3 |
| 10,258,171 B2* | 4/2019 | Le | A47F 5/0025 |
| 10,292,566 B2* | 5/2019 | Roth | A47L 15/502 |
| 2003/0098398 A1* | 5/2003 | Tsuchida | A47J 47/16 |
| | | | 248/37.6 |
| 2004/0144227 A1* | 7/2004 | White | B26B 29/063 |
| | | | 83/523 |
| 2006/0049123 A1* | 3/2006 | Berti | A47G 21/14 |
| | | | 211/70.7 |
| 2006/0113260 A1* | 6/2006 | Purushothaman | A47L 15/505 |
| | | | 211/41.9 |
| 2007/0119801 A1* | 5/2007 | Miele | A47L 15/502 |
| | | | 211/70.7 |
| 2009/0050585 A1* | 2/2009 | Lindgren | A47L 15/502 |
| | | | 248/37.3 |
| 2009/0101604 A1* | 4/2009 | Restis | A47L 19/02 |
| | | | 206/553 |
| 2009/0261049 A1* | 10/2009 | McQuary | A47F 7/0028 |
| | | | 211/70.7 |
| 2012/0279935 A1* | 11/2012 | McNally | A47B 88/988 |
| | | | 211/70.7 |
| 2015/0208899 A1* | 7/2015 | Lee | A47L 15/502 |
| | | | 211/41.9 |
| 2015/0327749 A1* | 11/2015 | Kåberg | A47L 15/505 |
| | | | 211/41.9 |
| 2015/0335225 A1* | 11/2015 | Seu | A47L 15/505 |
| | | | 211/41.9 |
| 2016/0128543 A1* | 5/2016 | Alwin | A47L 15/502 |
| | | | 211/70.7 |
| 2017/0112352 A1* | 4/2017 | Naik | A47L 15/22 |
| 2018/0249886 A1* | 9/2018 | Thompson | B32B 27/32 |
| 2021/0046515 A1* | 2/2021 | Fossnes | A47L 17/00 |
| 2025/0017440 A1* | 1/2025 | Park | A47L 15/502 |

FOREIGN PATENT DOCUMENTS

| | | | | | |
|---|---|---|---|---|---|
| CN | 213940658 | U | * | 8/2021 | |
| CN | 217723444 | U | * | 11/2022 | |
| CN | 221469810 | U | * | 8/2024 | |
| DE | 103 22 096 | | | 12/2004 | |
| DE | 10322096 | A1 | * | 12/2004 | A47L 15/502 |
| EP | 1275336 | A1 | * | 1/2003 | A47L 15/502 |
| EP | 3606395 | B1 | * | 11/2023 | A47L 15/502 |
| EP | 4491092 | A1 | * | 1/2025 | A47L 15/502 |
| JP | 11-178774 | | | 7/1999 | |
| JP | 11178774 | A | * | 7/1999 | |
| JP | 2001231737 | A | * | 8/2001 | |
| JP | 2012010725 | A | * | 1/2012 | |
| JP | 5592177 | | | 9/2014 | |
| JP | 5592177 | B2 | * | 9/2014 | |
| KR | 10-1435817 | | | 8/2014 | |
| WO | WO-2006010711 | A2 | * | 2/2006 | A47L 15/502 |

\* cited by examiner

FIG. 1
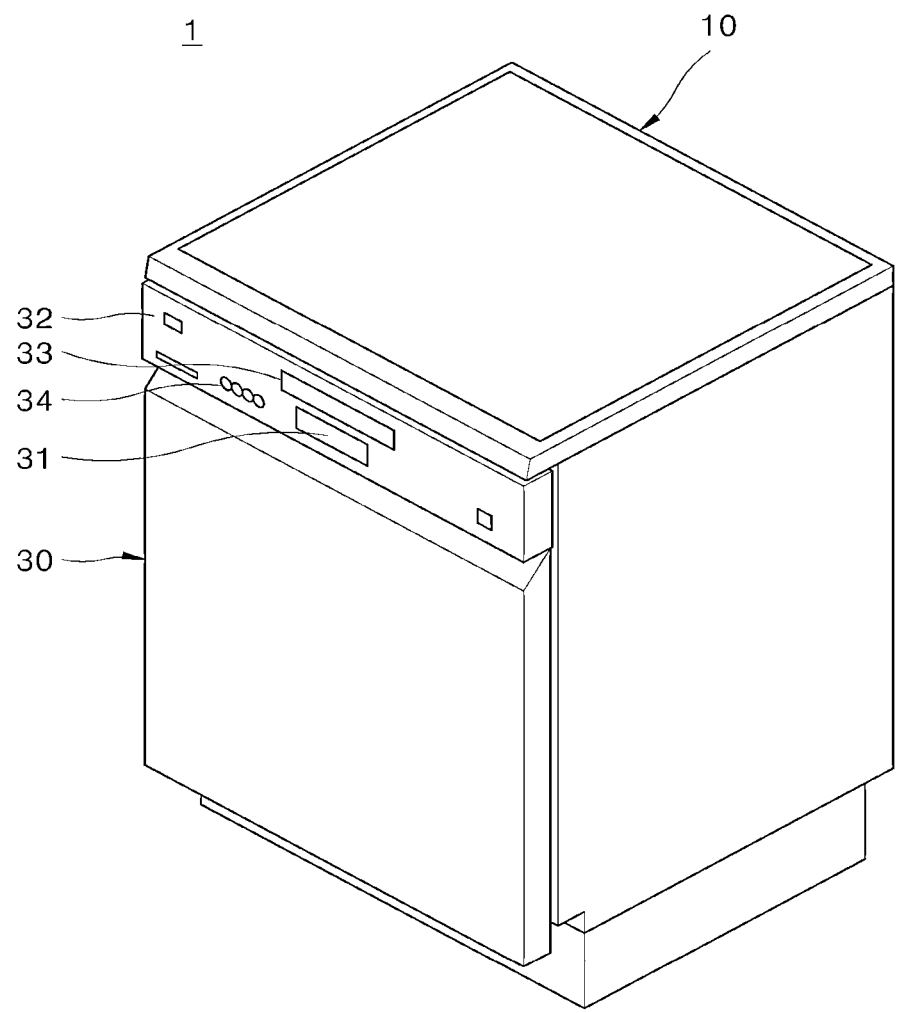
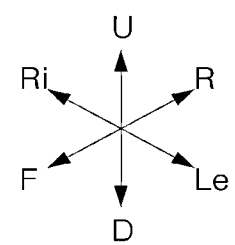

DISH WASHER HAVING A KNIFE RACK

CROSS-REFERENCE TO RELATED APPLICATION

This application claims priority to and benefit of Korean Patent Application No. 10-2023-0091525, filed on Jul. 14, 2023, which is hereby incorporated by reference as when fully set forth herein.

BACKGROUND

Field

The present disclosure relates to a dish washer. More specifically, the present disclosure relates to a dish washer having a knife rack in which a first slot and a second slot that guide movement of a blade portion of a knife are defined at an entrance to a receiving space of the blade portion as defined by a first main body and a second main body of the knife rack, and are spaced from each other along a longitudinal direction of the blade portion, such that when the blade portion is input into the receiving space, a front end of the blade portion is prevented from contacting the first main body and the second main body.

Description of Related Art

A dish washer is an apparatus that washes dishes and cooking utensils as washing targets stored therein by spraying washing water thereto. In this regard, the washing water may contain washing detergent.

A dish washer generally includes a washing tub having a washing space defined therein, a dish rack that accommodates therein a washing target inside the washing tub, a spraying arm that sprays the washing water into the dish rack, and a sump that stores therein water and supplies the washing water to the spraying arm.

Using this dish washer may allow a time and effort required to wash the dishes and other washing targets after a meal to be reduced, thereby contributing to user convenience.

Typically, the dish washer is configured to perform a washing cycle for washing a washing target, a rinsing cycle for rinsing a washing target, and a drying cycle for drying a washing target that has been washed and rinsed.

The dish washer may have a tub that has a washing space defined therein. The tub contains therein a dish rack constructed to extend from or retract into the washing space. A user may selectively store dishes on the dish rack depending on a type and a size of the dish.

In this regard, the dish rack may be provided in a plural manner. The dish racks may be arranged along a vertical direction of the washing space.

In this regard, at least one dish rack may be equipped with a knife rack for storing therein a cooking knife or a cooking scissors for the purpose of trimming or cutting food ingredients, etc. for the convenience of the user.

Japanese Patent No. 5592177 (Prior Art Document 001) discloses a dish washer provided with a knife rack in which a box-shaped storage space for accommodating the knife therein is defined by a grip-shaped rib.

However, the knife rack of Prior Art Document 001 does not have a separate structure to guide a direction of movement of a blade portion of the knife when the user inserts the knife into the box-shaped storage space. Therefore, if an entry direction of the blade portion when the blade portion is being inserted into the storage space is slightly deviated with respect to an extension direction of the storage space, a front end of the sharp blade portion gets caught in a gap defined in the grid-shaped rib, thereby causing inconvenience to the user.

Furthermore, the knife rack of Prior Art Document 001 does not have a structure to limit a movement range of a handle and the blade portion of the knife or restrain the movement of the handle and the blade portion of the knife.

Therefore, when the knife is inserted into the storage space, the knife falls down due to its own weight. Thus, there is a high possibility that the front end of the blade portion may collide with a bottom of the knife rack to form a dent in the bottom, or cause damage to the bottom of the knife rack.

In one example, in Korean Patent No. 10-1435817 (Prior Art Document 002), disclosed is a dish washer provided with a knife rack in which the blade portion is guided to enter the entrance of the storage space and move along a slot formed at the entrance of the storage space, and a handle support structure is formed so that the handle is supported thereon at the entrance of the storage space after storage of the blade portion therein has been completed.

However, since the knife rack of Prior Art Document 002 is configured to guide the entry angle of the blade portion with only a single slot formed at the entrance, the guide of the entry direction of the blade portion is poor, so that the problem as described above that the front end of the blade portion gets caught in the gap defined in the grid-shaped rib cannot be completely resolved.

Furthermore, since the knife is inserted and supported in an upright state along a vertical direction, there is a problem in that a knife with a relatively long blade portion is not applicable to the knife rack of Prior Art Document 002.

Furthermore, the knife rack of Prior Art Document 002 does not have a means to prevent the movement of the handle and the blade portion of the knife when an impact in the horizontal direction is applied to the handle when the knife is fully received in the storage space.

Therefore, when a horizontal impact or load is applied to the handle, the blade portion rotates around the slot that acts as the entrance to the storage space. Thus, there is a high possibility that when the blade portion rotates, a collision of the blade portion with the knife rack may occur, causing noise or damage to the knife rack.

Furthermore, the knife rack of Prior Art Document 002 is configured so that multiple knife racks are arranged in parallel with each other and overlap each other along the horizontal direction.

Therefore, the blade portion of one knife disposed at a more inward position may prevent the scattered washing water from reaching the blade portion of another knife disposed outwardly thereof. Accordingly, there is a very high possibility that there may be a difference between washing amounts of the blade portions of the horizontally arranged blades.

Furthermore, the knife rack of Prior Art Document 002 does not have a holding means for holding scissors having a similar function and shape to those of the knife.

Therefore, the scissors should be placed on the dish rack in order to be washed in a state in which two blades thereof non-overlap each other and are spaced from each other, such that an area size occupied by the scissors increases, thereby reducing a storage space of other dishes, resulting in decrease in washing efficiency.

Prior art literature: Patent Document 001: Japanese Patent No. 5592177

Prior art literature: Patent Document 002: Korean Patent No. 10-1435817

SUMMARY

The present disclosure has been designed to solve the problems of the prior art. Thus, a first purpose of the present disclosure is to provide a dish washer having a knife rack in which a first slot and a second slot that guide movement of a blade portion of a knife are defined at an entrance to a receiving space of the blade portion as defined by a first main body and a second main body of the knife rack, and are spaced from each other along a longitudinal direction of the blade portion, such that when the blade portion is input into the receiving space, a front end of the blade portion is prevented from contacting the first main body and the second main body.

Furthermore, a second purpose of the present disclosure is to provide a dish washer having a knife rack in which a step is formed at an entrance of the receiving space and a handle of the knife is supported on the step, so that the handle may be stably supported in the direction of gravity after the insertion of the blade portion into the receiving space has been completed.

Furthermore, a third purpose of the present disclosure is to provide a dish washer having a knife rack in which the knife rack is constructed such that the blade portion of the knife is received in the receiving space so that a longitudinal direction of the blade portion of the knife has a downward inclination angle of 20 degrees or smaller with respect to the horizontal direction, so that a collision due to the movement of the blade portion due to its own weight when the blade portion is inserted therein may be minimized, and a vertical space amount occupied with the knife may be significantly lowered, thereby allowing the knife with a relatively long blade portion to be reliably received in the knife rack.

Furthermore, a fourth purpose of the present disclosure is to provide a dish washer having a knife rack in which a scattered reflection inducing portion that scatters washing water toward the blade portion is disposed on an inner side surface of a first main body which is disposed closer to the tub among the first main body and a second main body, thereby improving the washing power on the blade portion.

Furthermore, a fifth purpose of the present disclosure is to provide a dish washer having a knife rack in which the knife rack is constructed to have a plurality of receiving spaces for receiving a plurality of knives, respectively, and is further configured so that the blade portions of the knifes respectively received in the receiving spaces are arranged so as not to overlap each other in the horizontal direction, so that a difference between washing amounts of the blade portions of the blades may be minimized.

Purposes of the present disclosure are not limited to the above-mentioned purpose. Other purposes and advantages of the present disclosure that are not mentioned may be understood based on following descriptions, and may be more clearly understood based on embodiments of the present disclosure. Further, it will be easily understood that the purposes and advantages of the present disclosure may be realized using means shown in the claims and combinations thereof.

One aspect of the present disclosure provides a dish washer comprising: a tub having a washing space defined therein and constructed to accommodate therein a dish; a dish rack constructed to extend from or retract into the washing space, wherein the dish is stored in the dish rack; and a knife rack removably mounted to the dish rack, wherein the knife rack has a receiving space defined therein into which a blade portion of a knife is inserted, wherein the knife rack includes: a first main body defining one side surface of the receiving space; a second main body defining the other side surface opposite to the one side surface of the receiving space, wherein the second main body is spaced apart from the first main body along a thickness direction of the blade portion; and a slot into which the blade portion is inserted when the blade portion is inserted into the receiving space, wherein the slot is configured to guide movement of the blade portion of the knife so that the blade portion does not contact the first main body and the second main body while the blade portion is being inserted into the receiving space.

In accordance with some embodiments of the dish washer of the present disclosure, the slot includes a first slot and a second slot separate from each other and arranged so as to be spaced apart from each other along a longitudinal direction of the blade portion, wherein each of the first and second slots extends along a direction intersecting the longitudinal direction of the blade portion.

In accordance with some embodiments of the dish washer of the present disclosure, each of the first slot and the second slot has a width sized such that the blade portion can be inserted into each of the first slot and the second slot while a handle of the knife cannot be inserted into each of the first slot and the second slot.

In accordance with some embodiments of the dish washer of the present disclosure, a portion of the receiving space positioned between the first slot and the second slot is open in both upward and downward directions.

In accordance with some embodiments of the dish washer of the present disclosure, the first slot is positioned at a lower vertical level than a vertical level of the second slot.

In accordance with some embodiments of the dish washer of the present disclosure, am upper end of the first slot is open upwardly, while a lower end of the first slot is blocked.

In accordance with some embodiments of the dish washer of the present disclosure, a length in a longitudinal direction of the blade portion of the first slot is larger than a length in the longitudinal direction of the blade portion of the second slot.

In accordance with some embodiments of the dish washer of the present disclosure, a step portion is formed at a rear end of the receiving space into which a front end of the blade portion is inserted, wherein the first slot is defined under a lower end of the step portion, wherein the second slot is formed in a front end of the step portion.

In accordance with some embodiments of the dish washer of the present disclosure, when insertion of the blade portion into the receiving space has been completed, the handle of the knife is supported on the lower end of the step portion.

In accordance with some embodiments of the dish washer of the present disclosure, the lower end of the step portion extends linearly along a longitudinal direction of the blade portion.

In accordance with some embodiments of the dish washer of the present disclosure, the receiving space extends along a direction parallel to a longitudinal direction of the blade portion, wherein the blade portion is inserted into the receiving space in a direction from a rear end of the receiving space to a front end of the receiving space, wherein an extension direction of the receiving space defines a downward inclination angle with respect to the horizontal direction.

In accordance with some embodiments of the dish washer of the present disclosure, the knife rack further includes a plurality of lower bridge ribs, each having one end connected to the first main body and the other end connected to the second main body, wherein the plurality of lower bridge ribs are constructed to prevent the blade portion from moving downwardly in a state in which the blade portion has been held in the receiving space, wherein the plurality of lower bridge ribs are arranged along the extension direction of the receiving space.

In accordance with some embodiments of the dish washer of the present disclosure, the knife rack further includes a plurality of upper bridge ribs, each having one end connected to the first main body and the other end connected to the second main body, wherein the plurality of upper bridge ribs are constructed to prevent the blade portion from moving upwardly while the blade portion has been held in the receiving space, wherein the plurality of upper bridge ribs are arranged along the extension direction of the receiving space.

In accordance with some embodiments of the dish washer of the present disclosure, a shortest distance from the slot to the upper bridge rib closest to the slot among the plurality of upper bridge ribs is smaller than a length of a handle of the knife.

In accordance with some embodiments of the dish washer of the present disclosure, the downward inclination angle is in a range of 10 to 20 degrees.

In accordance with some embodiments of the dish washer of the present disclosure, the knife rack further includes a scattered reflection inducing portion disposed on an inner side surface of the first main body and constructed to scatter washing water flowing into the washing space toward the blade portion.

In accordance with some embodiments of the dish washer of the present disclosure, the scattered reflection inducing portion includes a plurality of bar-shaped ribs protruding from the inner side surface of the first main body toward the blade portion.

In accordance with some embodiments of the dish washer of the present disclosure, the scattered reflection inducing portion includes a plurality of grooves recessed in the inner side surface of the first main body.

In accordance with some embodiments of the dish washer of the present disclosure, the knife rack further includes an additional holder protruding from an outer side surface of the second main body so as to extend away from the receiving space, wherein one of two blade portions of scissors is held in the additional holder in a state in which the two blade portions non-overlap each other.

In accordance with some embodiments of the dish washer of the present disclosure, the additional holder includes: an outward extension portion protruding from the outer side surface of the second main body in an inverted L shape; and a through-hole extending through the outward extension portion and extending in an inverted L shape from one end to the other end thereof, wherein one of the two blade portions of the scissors is inserted into the through-hole and held in the additional holder in a state in which the two blade portions non-overlap each other.

In accordance with some embodiments of the dish washer of the present disclosure, a lower end of the through-hole acts as a first support end supporting the other of the pair of blade portions, wherein an upper end surface of the outward extension portion acts as a second support end supporting the other of the pair of blade portions, wherein a vertical level of the first support end is lower than a vertical level of the second support end.

In accordance with some embodiments of the dish washer of the present disclosure, the receiving space includes: a first receiving space for accommodating therein a first knife; and a second receiving space communicating with the first receiving space, wherein a second knife is accommodated in the second receiving space, wherein the first receiving space and the second receiving space non-overlaps each other in a horizontal direction.

In accordance with some embodiments of the dish washer of the present disclosure, the first receiving space and the second receiving space partially overlap each other in the vertical direction.

Using the knife rack of the dish washer according to the present disclosure, when the blade portion is input into the receiving space, the front end of the blade portion is prevented from contacting the first main body and the second main body.

Furthermore, using the knife rack of the dish washer according to the present disclosure, the handle may be stably supported in the direction of gravity after the insertion of the blade portion into the receiving space has been completed.

Furthermore, using the knife rack of the dish washer according to the present disclosure, a collision due to the movement of the blade portion due to its own weight when the blade portion is inserted therein may be minimized, and a vertical space amount occupied with the knife may be significantly lowered, thereby allowing the knife with a relatively long blade portion to be reliably received in the knife rack.

Furthermore, using the knife rack of the dish washer according to the present disclosure, the scattered reflection inducing portion that scatters washing water toward the blade portion is disposed on the inner side surface of the first main body which is disposed closer to the tub among the first main body and a second main body, thereby improving the washing power on the blade portion.

Furthermore, using the knife rack of the dish washer according to the present disclosure, the blade portions of the knifes respectively received in the receiving spaces are arranged so as not to overlap each other in the horizontal direction, so that a difference between washing amounts of the blade portions of the blades may be minimized.

In addition to the above-mentioned effects, the specific effects of the present disclosure as not mentioned will be described below along with the descriptions of the specific details for carrying out the present disclosure.

BRIEF DESCRIPTION OF DRAWINGS

FIG. 1 is a front perspective view of a dish washer according to an embodiment of the present disclosure.

DETAILED DESCRIPTIONS

Figure 2:
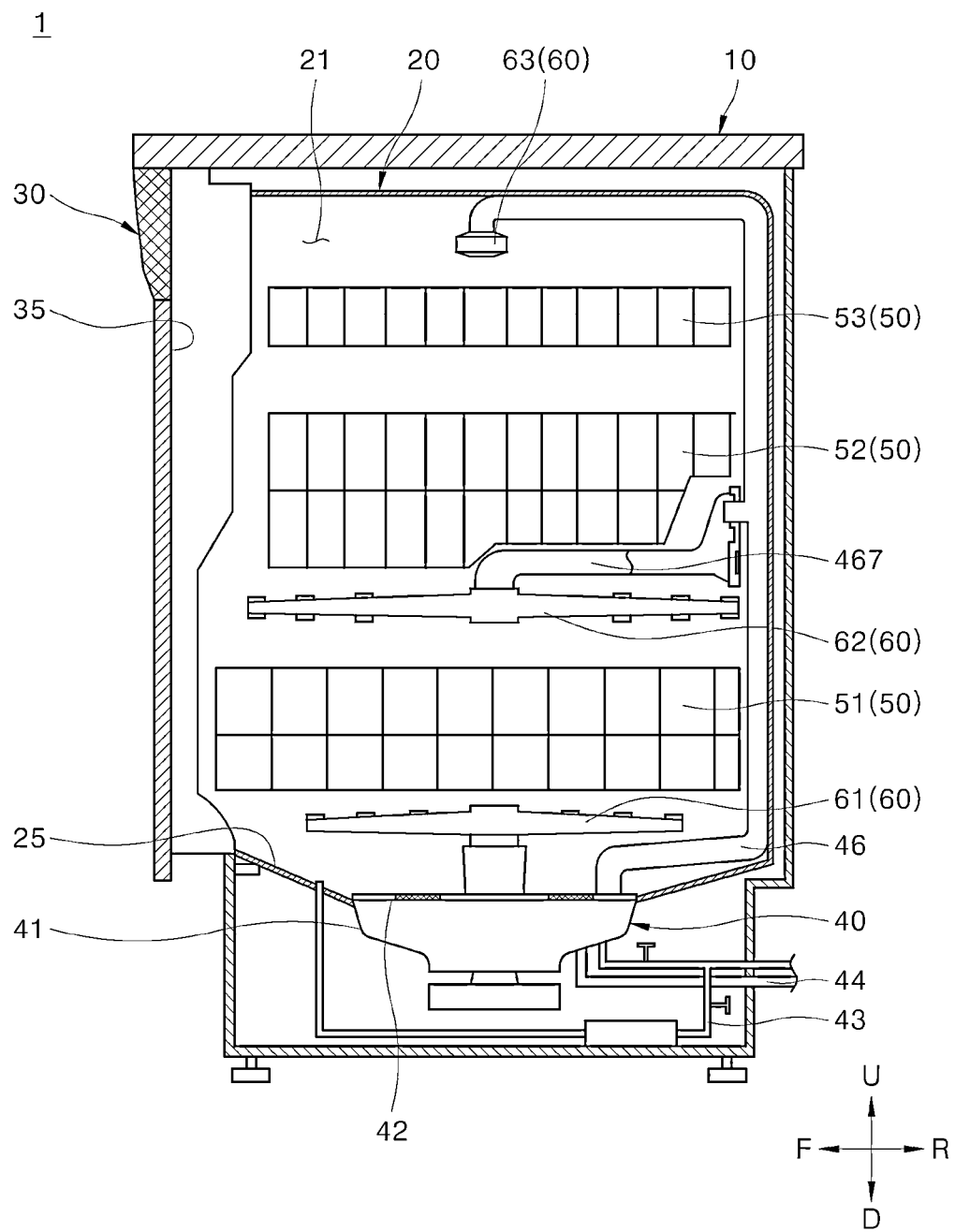
FIG. 2 is a schematic cross-sectional view of the dish washer shown in FIG. 1.

The above-mentioned purpose, features and advantages are described in detail below with reference to the attached drawings. Accordingly, a person skilled in the art in the technical field to which the present disclosure belongs will be able to easily implement the technical idea of the present disclosure. In describing the present disclosure, when it is determined that a detailed description of the known technology related to the present disclosure may unnecessarily obscure the gist of the present disclosure, the detailed description thereof is omitted. Hereinafter, preferred embodiments according to the present disclosure will be described in detail with reference to the attached drawings. In the drawings, identical reference numerals are used to indicate identical or similar components.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise.

It will also be understood that when a first element or layer is referred to as being present "on" a second element or layer, the first element may be disposed directly on the second element or may be disposed indirectly on the second element with a third element or layer being disposed between the first and second elements or layers. It will also be understood that when a first element or layer is referred to as being present "under" a second element or layer, the first element may be disposed directly under the second element or may be disposed indirectly under the second element with a third element or layer being disposed between the first and second elements or layers.

It will be understood that when an element or layer is referred to as being "connected to", or "coupled to" another element or layer, it may be directly connected to or coupled to another element or layer, or one or more intervening elements or layers therebetween may be present. In addition, it will also be understood that when an element or layer is referred to as being "between" two elements or layers, it may be the only element or layer between the two elements or layers, or one or more intervening elements or layers therebetween may also be present.

It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

Spatially relative terms, such as "beneath," "Hereinafter," "lower," "under," "above," "upper," and the like, may be used herein for ease of explanation to describe one element or feature's relationship to another element or feature as illustrated in the figures. It will be understood that the spatially relative terms are intended to encompass different orientations of the device in use or in operation, in addition to the orientation depicted in the figures.

As used herein, "A and/or B" means A, B or A and B, unless specifically stated otherwise. Expression such as "at least one of" when preceding a list of elements may modify the entirety of list of elements and may not modify the individual elements of the list. As used herein, "C to D" means C inclusive to D inclusive unless otherwise specified.

Hereinafter, the present disclosure will be described with reference to drawings showing a configuration according to an embodiment of the present disclosure.

[Overall Structure of Dish Washer]

Hereinafter, an overall structure of a dish washer 1 according to an embodiment of the present disclosure will be described in detail with reference to the attached drawings.

FIG. 1 is a front perspective view showing the dish washer according to the present disclosure. FIG. 2 is a simplified cross-sectional view briefly showing an internal structure of the dish washer according to the present disclosure.

As shown in FIG. 1 and FIG. 2, the dish washer 1 according to the present disclosure may include a casing 10 that constitutes an exterior appearance, a tub 20 installed in an inner space of the casing 10 and having a washing space 21 defined therein where the washing target is washed, wherein a front surface of the tub is open, a door 30 that opens/closes the open front surface of the tub 20, a driver 40 located under the tub 20 to supply, collect, circulate, and discharge the washing water for washing the washing target, a dish rack 50 removably provided in the inner washing space 21 of the tub 20 to receive therein the washing target, and a water sprayer 60 installed adjacent to the dish rack 50 to spray the washing water for washing the washing target thereto.

In this regard, the washing target received in the dish rack 50 may be, for example, dishes such as bowls, plates, spoons, and chopsticks, and other cooking utensils. Hereinafter, unless otherwise specified, the washing target will be referred to as a dish.

The tub 20 may be formed in a box shape with an entirely open front surface, and have a configuration of a so-referred to as washing tub.

The washing space 21 may be defined inside the tub 20. The open front surface of the tub 20 may be opened/closing by the door 30.

The tub 20 may be formed via pressing of a metal plate resistant to high temperature and moisture, for example, a stainless steel plate.

Moreover, on an inner surface of the tub 20, a plurality of brackets may be disposed for the purpose of supporting and installing functional components such as the dish rack 50 and the water sprayer 60 which will be described later thereon within the tub 20.

In one example, the driver 40 may include a sump 41 that stores therein washing water, a sump cover 42 that distinguishes the sump 41 from the tub 20, a water supply 43 that supplies washing water from an external source to the sump 41, a water discharger 44 that discharges the washing water of the sump 41 to an outside, and a washing pump and a supply flow path 46 that supply the washing water of the sump 41 to the water sprayer 60.

The water supply 43 serves to supply washing water supplied from an external water supply source to the sump 41.

Although not shown, the water supply 43 may include a water jacket that stores therein the washing water supplied from the external water supply source, and a water softening device that softens the washing water stored in the water jacket.

The sump cover 42 may be disposed at a top of the sump 41 and may serve to distinguish the tub 20 and the sump 41 from each other. Moreover, the sump cover 42 may have a plurality of collecting holes defined therein for collecting washing water sprayed into the washing space 21 through the water sprayer 60 into the sump 41.

That is, the washing water sprayed from the water sprayer 60 toward the dish may fall down to a bottom of the washing space 21, and may be collected again through the sump cover 42 and into the sump 41.

The washing pump may be disposed at a side or a bottom of the sump 41 and may serve to pressurize the washing water and supply the pressurized washing water to the water sprayer 60.

One end of the washing pump may be connected to the sump 41 and the other end thereof may be connected to the supply flow path 46. In one example, the supply flow path 46 may serve to selectively supply the washing water supplied from the washing pump to the water sprayer 60.

In one example, the water sprayer 60 may be constructed to spray the washing water to the dishes stored in the dish rack 50.

More specifically, the water sprayer 60 may include the lower spraying arm 61 located under the tub 20 to spray the washing water to a lower rack 51, the upper spraying arm 62 located between the lower rack 51 and an upper rack 52 to spray the washing water to the lower rack 51 and the upper rack 52, and the top nozzle 63 located on top of the tub 20 to spray the washing water to a top rack 53 or the upper rack 52.

In particular, the lower spraying arm 61 and the upper spraying arm 62 may be rotatably disposed in the washing space 21 of the tub 20 and may spray the washing water toward the dish of the dish rack 50 while being rotating.

The lower spraying arm 61 may be rotatably supported on a top of the sump cover 42 so as to spray the washing water toward the lower rack 51 while being rotating and being disposed under the lower rack 51.

Moreover, the upper spraying arm 62 may be rotatably supported by a spraying arm holder 467 so as to spray the washing water on the dish while being rotating and being disposed between the lower rack 51 and the upper rack 52.

In one example, although not shown, in order to increase washing efficiency, additional means for diverting the washing water sprayed from the lower spraying arm 61 into an upward direction (diverting in a U-direction) may be provided at a lower surface 25 of the tub 20.

Since a configuration already known in the art may be applied to a detailed configuration of each of the driver 40 and the water sprayer 60, description of a specific configuration of each of the driver 40 and the water sprayer 60 will be omitted below.

The dish rack 50 for storing the dish therein may be disposed in the washing space 21.

The dish rack 50 may be constructed to extend or retract from or into the inner space of the tub 20 through the open front surface of the tub 20.

For example, in FIG. 2, an embodiment is shown in which the dish rack 50 includes the lower rack 51 located at a lower portion of the tub 20 to accommodate therein relatively large dishes, the upper rack 5 located on top of the lower rack 51 to accommodate therein medium-sized dishes, and the top rack 53 located at a top level of the tub 20 and capable of storing therein small dishes, etc. However, the present disclosure is not limited thereto. However, hereinafter, an example in which the dish washer includes the three dish racks 50 as shown is described.

Each of the lower rack 51, the upper rack 52, and the top rack 53 may be constructed to extend or retract from or into the inner space of the tub 20 through the open front surface of the tub 20.

For this purpose, guide rails (not shown) may be respectively disposed on both opposing walls constituting an inner surface of the tub 20. By way of example, the guide rails may include an upper rail, a lower rail, and a top rail.

Wheels may be disposed on a bottom of each of the lower rack 51, the upper rack 52, and the top rack 53. The user may extend the lower rack 51, the upper rack 52, and the top rack 53 from the inner space of the tub 20 through the open front surface of the tub 20 and may place the dishes thereon, or easily withdraw the dishes that have been washed out thereof.

The lower rack 51 or the upper rack 52 may be provided with a knife rack that may accommodate therein a household knife such as a large sized knife, a small sized knife, scissors, etc., as will be described later. A detailed configuration of the knife rack will be described later with reference to FIG. 3.

The guide rail may be embodied as a simple rail-type fixed guide rail to guide the extending or the retracting of the rack 50, or a telescopic guide rail capable of guiding the extending or the retracting of the rack 50 and at the same time, increasing an extension distance thereof as the rack 50 further extends from the inner space of the tub.

In one example, the door 30 is configured for opening/closing the open front surface of the tub 20 as described above.

A hinge (not shown) around which the door 30 is closed or opened may be provided at a bottom of the open front surface. Thus, the door 30 may pivot around the hinge as a pivot axis.

In this regard, a handle 31 for opening the door 30 and a control panel 32 for controlling the dish washer 1 may be disposed on a front surface or a top surface as an outer side surface of the door 30.

As shown, the control panel 32 disposed on the front surface of the door 30 may include a display 33 that visually displays information regarding a current operating status of the dish washer, etc., and a button unit 34 including a selection button through which a user's selection manipulation is input and a power button through which a user's manipulation for turning the dish washer on and off is input.

In one example, an inner side surface 35 of the door 30 may constitute a front surface as one surface of the tub 20 when the door 30 has been closed, and may constitute a seat surface on which the lower rack 51 of the dish rack 50 is supported when the door 30 is fully opened.

For this purpose, when the door 30 is fully opened downwardly, the inner side surface 35 of the door 30 may constitute a horizontal plane extending in the same direction as a direction in which the guide rail guiding the displacement of the lower rack 51 extends.

[Detailed Structure of Lower Rack]

Hereinafter, the detailed structure of the lower rack 51 and its related configuration will be described in detail with reference to FIG. 3.

As described above, the dish washer 1 may have the lower rack 51 that constitutes a plurality of dish racks 50 that store therein dishes as washing targets.

The lower rack 51 may be accommodated in a lower portion of the washing space 21 inside the tub 20 of the dish washer 1, and may be constructed to extend from or retract into the washing space through the open front surface of the tub 20. Accordingly, the lower rack 51 may be constructed to be movable in the washing space 21.

More specifically, as shown, the lower rack 51 may be configured to include a handle 511, a guide bar 512, a wire 513, a tine 514, and a pivotable dish holder 515.

The handle 511 of the lower rack 51 may be used to insert the lower rack 51 into the washing space 21 of dish washer 1 while the user holds the lower rack 51, or to withdraw the lower rack 51 from the washing space 21. To this end, the handle 511 may be disposed on a top of a front surface of the lower rack.

One end of the guide bar 512 may be coupled to the handle 511. The guide bar 512 together with the handle 511 may constitute an outer appearance of an upper end of the lower rack 51. Therefore, the guide bar 512 may be provided in a shape of a bar extending along the upper end of the lower rack 51.

The wire 513 plays a role in constituting an outer appearance of the lower rack 51.

The wires 513 may be connected to each other while intersecting each other to have an overall mesh shape.

Accordingly, a large open space is defined by adjacent ones of the plurality of wires 513. The washing water flows through this open space and collides with the dishes accommodated on the lower rack 51, thereby washing the dishes.

Furthermore, a bent portion may be formed in each of some of the wires 513. Accordingly, the wires 513 may be connected to each other so as to from an overall basket-shaped outer appearance defining a receiving space in which the dishes are accommodated.

In one example, the tine 514 serves to hold the dishes of various types and shapes on the lower rack 51. The tine 514 may be provided in a form of a rod having one end as a fixed end mounted on the wire 513 and the other end as a free end.

The tine 514 may include a plurality of tines. Each of the tines 514 may be positioned at a predetermined position of the lower rack. A series of tines 514 may be arranged in the same direction and may be spaced from each other by a predetermined spacing to form an array of tines 514.

The tine 514 may be classified into a fixed type tine fixed to the wire 513 and as a pivotable type tine that may pivot with respect to the wire 513. The pivotable type tine may be constructed to lie down or stand up on the lower rack 51.

The pivotable tine 514 may pivot so as to stand up, and then the dish with a small area size or volume may be stably mounted on the lower rack 51 by the standing up tine. Alternatively, the pivotable tine 514 may pivot so as to lie down to secure an area size or space where the dish with a large area size or volume may be stored.

The pivotable dish holder 515 serves to hold the dishes with a large area size, but with a relatively small volume and having a flat shape, such as large bowls and frying pans on the lower rack 51.

The pivotable dish holder 515 may be pivotably mounted on the lower rack 51 with respect to the lower rack 51 and may be disposed at an edge of the lower rack 51. FIG. 3 shows a configuration of one example in which the pivotable dish holder 515 is disposed on the right side surface of the lower rack 51.

When the flat-shaped dish is held on the pivotable dish holder 515, the flat-shaped dish may be stably held on the left side surface of the lower rack 51. There may be a space left in the lower rack 51 in which other dishes are stored in other locations. Therefore, the space efficiency of the lower rack 51 may be improved by this pivotable dish holder 515.

Figure 3:
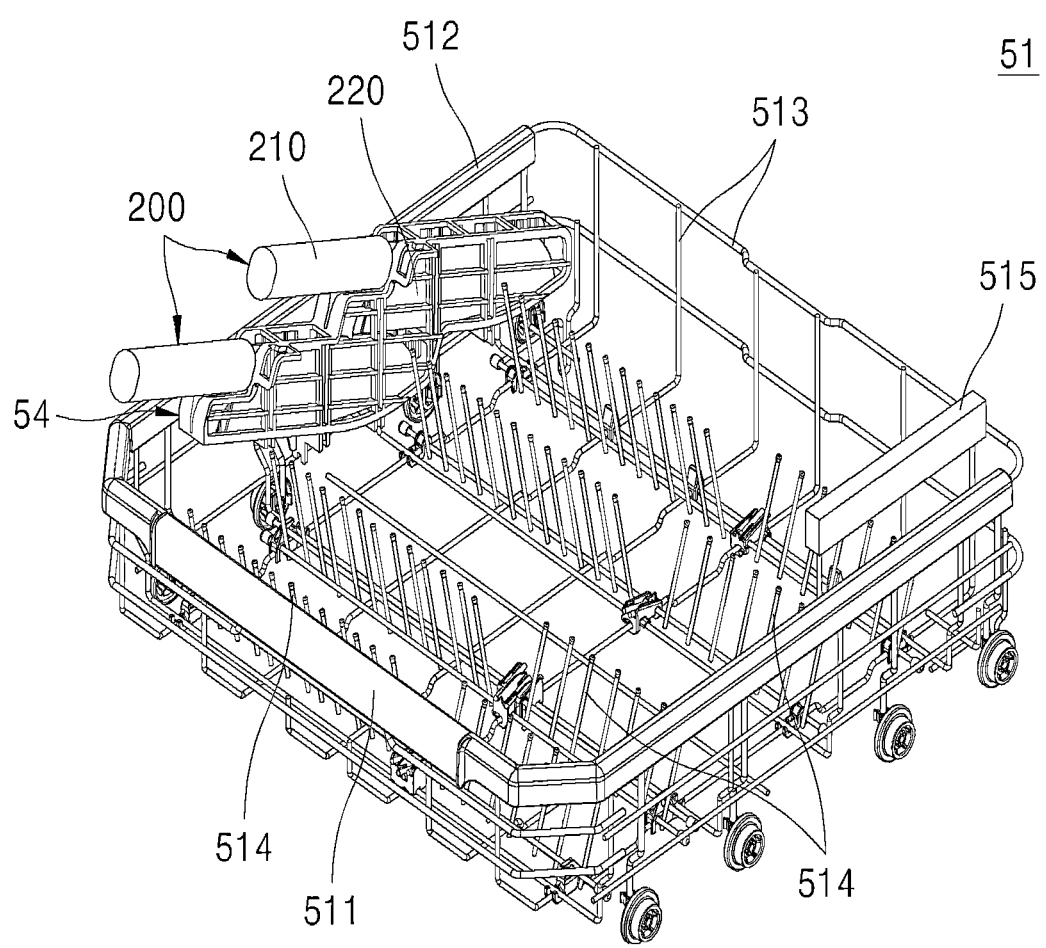
FIG. 3 is a front perspective view showing a knife rack installed on a lower rack as shown in FIG. 2.
Figure 4:
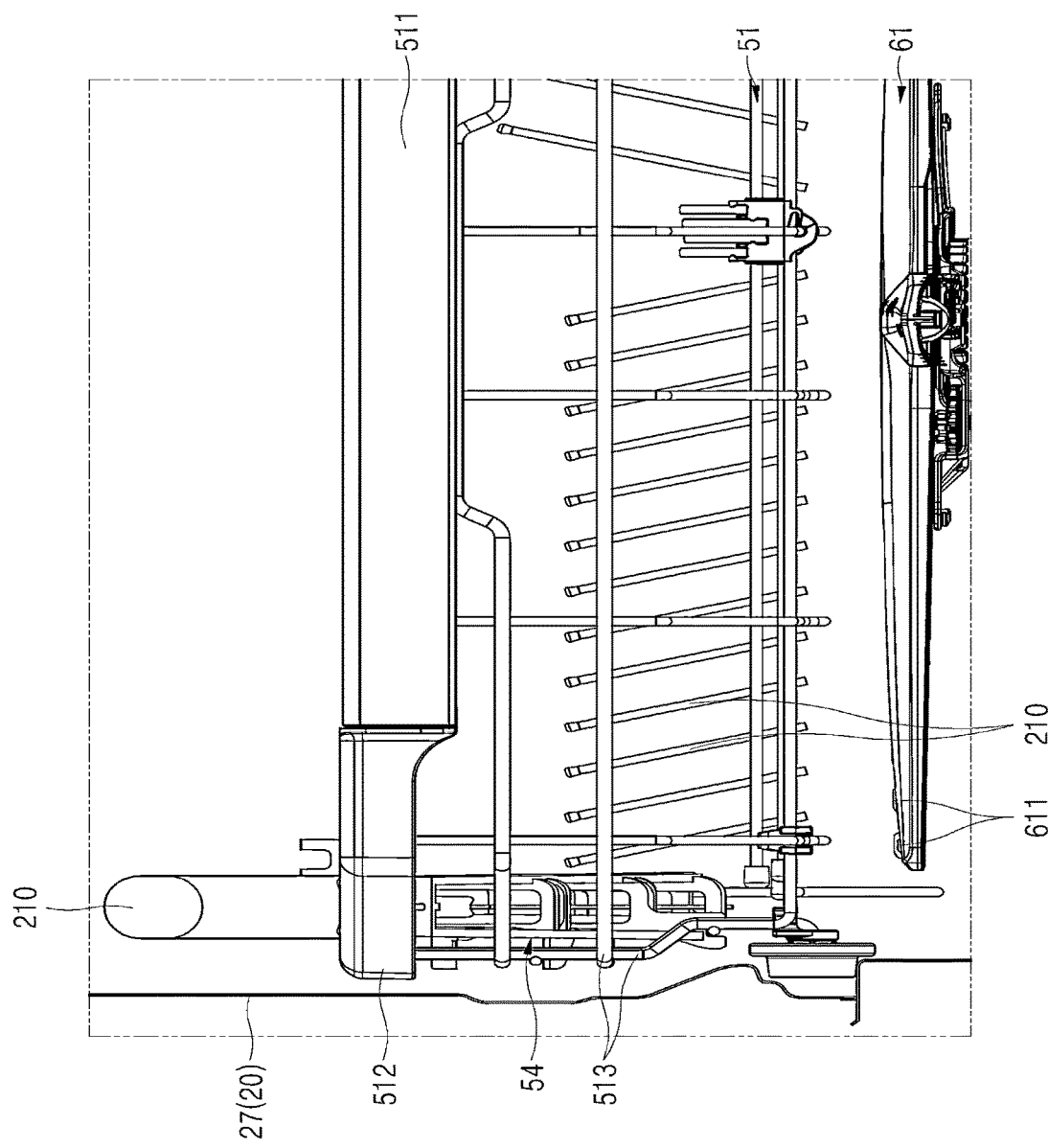
FIG. 4 is a front view of a lower rack as shown in FIG. 3, and is a partial enlarged view to illustrate a relationship between the knife rack, a lower spraying arm, and a tub.

In one example, as shown in FIG. 3 and FIG. 4, the lower rack 51 may be further equipped with a knife rack 54 for holding kitchen knives such as a cooking knife and a fruit knife. The knife rack 54 may be referred to by various names, such as a rack for dishes with sharp edges, a cutlery rack, or a cutlery holder.

FIG. 3 and FIG. 4 show a configuration in which the knife rack 54 is disposed on a left side surface of the lower rack 51 which is opposite to the right side surface on which the pivotable dish holder 515 is disposed, in order to prevent interference of the knife rack 54 with the pivotable dish holder 515.

However, this is only an example, and the knife rack 54 may be constructed to be disposed at a location where interference of the knife rack 54 with the components of the lower rack 51, such as the pivotable dish holder 515, may be minimized. For example, the knife rack 54 may be disposed on a rear or front surface of the lower rack 51.

However, embodiments of the present disclosure are not limited thereto. The description as set forth below will be based on the configuration in which the knife rack 54 is disposed on the left side surface of the lower rack 51 as shown in the illustrated embodiment.

Figure 5:
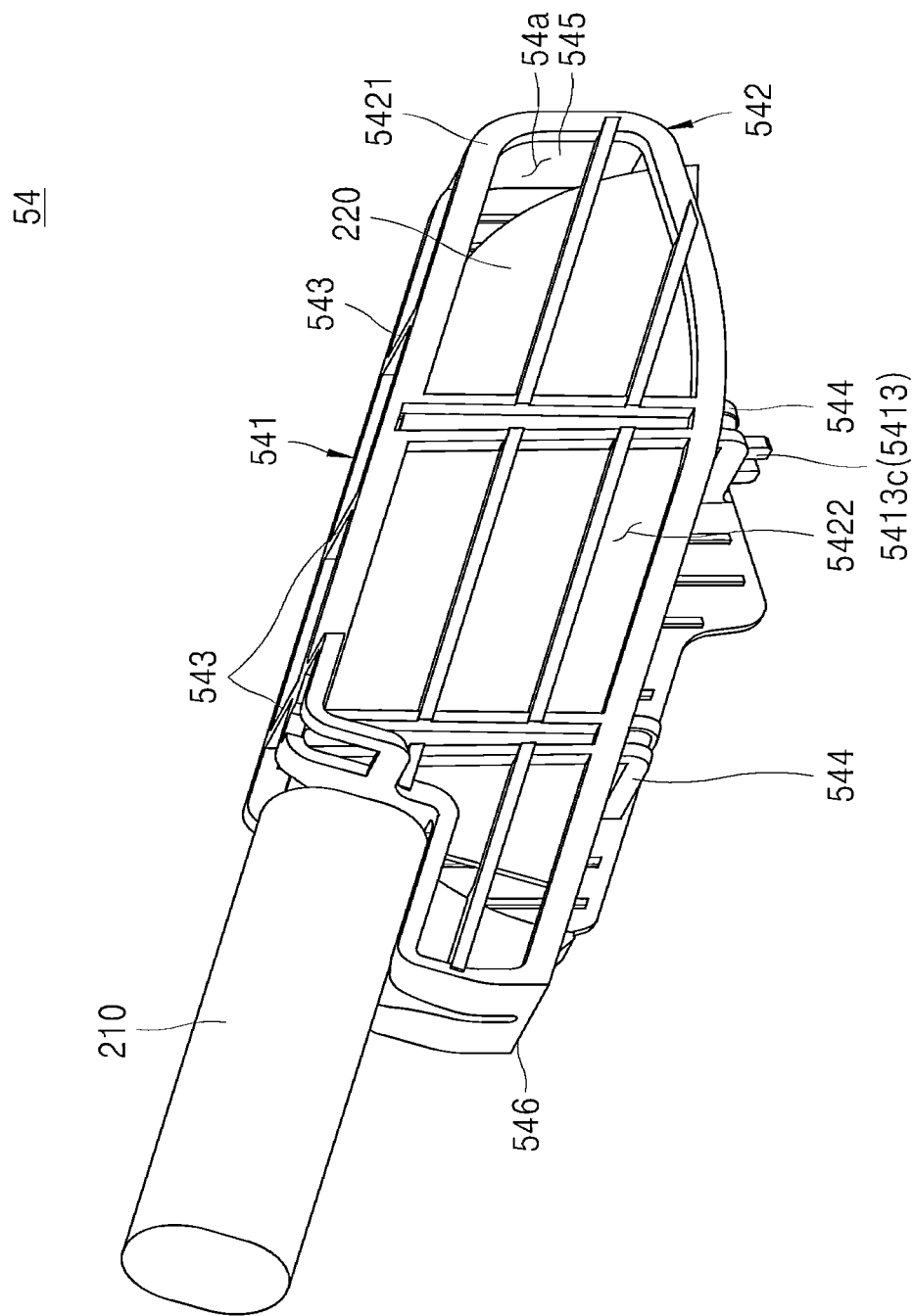
FIG. 5 is a front perspective view showing a knife held in the knife rack in FIG. 3.

As shown in FIG. 4 and FIG. 5, the knife rack 54 included in the dish washer 1 according to an embodiment of the present disclosure may be constructed to accommodate the knife 200 in a state in which a blade portion 220 of the knife 200 stands upright.

In this regard, in order to protect the blade itself of the blade portion 220 and prevent other dishes from being damaged by the sharp blade, the knife 200 may be stored and mounted on the knife rack 54 in a state in which the blade portion stands upright such that a blade as a front end of the blade portion 220 faces downwards and a spine as a back end of the blade portion 220 of the knife faces upwards.

Therefore, the knife 200 may be mounted so that a thickness direction of the blade portion 220 of the knife 200 is parallel to a horizontal direction, that is, one side surface of the blade portion 220 and the other side surface thereof opposite to each other are parallel to the right side surface of the lower rack 51.

In this way, the blade portion 220 of the knife 200 may be held in an upright state, such that a horizontal dimension or width of the knife rack 54 may be maintained at a roughly constant and minimum value while the knife rack extends along a longitudinal direction of the knife 200.

Therefore, the interference of the knife rack 54 on other dishes stored in the lower rack 51 may be minimized, and an occupancy of the knife rack 54 in the storage space of the lower rack 51 may be minimized.

Since the knife rack 54 is disposed closer to the left side surface of the lower rack 51 while the blade portion 220 stands upright in the above described manner, a first main body 541 of the knife rack 54 facing the left side surface of the lower rack 51 may be provided with a mount 5413 for detachable coupling of the knife rack 54 to the lower rack 51.

The knife rack 54 serves to hold the knife 200 so that the blade portion 220 and the handle 210 may be washed using washing water as other dishes stored in the lower rack 51 may be washed.

As shown, the knife rack 54 together with the lower rack 51 may be disposed on top of the lower spraying arm 61. The knife rack 54 is disposed to be directly coupled to the left side surface of the lower rack 51, such that the knife rack 54 may be disposed so as to non-overlap the lower spraying arm 61 in the vertical direction.

The washing water sprayed from the nozzle 611 of the lower spraying arm 61 directly collides with the blade portion 220 and the handle 210 due to a centrifugal force, or the washing water scattered after colliding with the dish stored in the lower rack 51 collides with the blade portion 220 and the handle 210. Thus, the blade portion 220 and the handle 210 may be washed.

Furthermore, although not shown, the washing water which falls downward from the upper rack 52 or scatters after falling downward therefrom collides with the blade portion 220 and the handle 210. Thus, the blade portion 220 and the handle 210 may be washed.

In order to secure the washing power of the knife 200 using the scattering washing water, an upper side surface, a lower portion surface, and a left side surface defining a receiving space 54*a* defined in the knife rack 54 may be formed to be as open as possible such that smooth inflow of the washing water into the receiving space 54*a* may be achieved.

Therefore, as will be described later, an opening 5422 open toward the washing space 21 of the tub 20 may be defined in a second main body 542 defining the right side surface of the receiving space 54*a* except for an edge 5421 of the second main body 542. In this regard, a plurality of ribs for reinforcing the strength of the second main body 542 and protecting the blade portion 220 may be disposed in the opening 5422 of the second main body 542 and may be integrally connected to the edge 5421 of the second main body 542.

In one example, as shown in FIG. 4, a spacing in a horizontal direction may be defined between the first main body 541 defining the left side surface of the receiving space 54*a* and a left side portion 27 of the tub 20.

Due to this spacing, the washing effect of the blade portion 220 by the washing water that is scattered after colliding with the left side portion of the tub 20 and then flows into the receiving space 54*a* through the first main body 541 may be highly likely to be lower than the washing effect of the blade portion 220 by the washing water that flows into the receiving space 54*a* through the opening 5422 of the second main body 542. Therefore, the washing effect on one side surface of the blade portion 220 facing the left side surface of the tub 20 may be lower than the washing effect on the other side surface of the blade portion 220 facing the second main body 542.

In order to prevent the decrease in the washing effect on the one side surface of the blade portion 220, the first main body 541 of the knife rack 54 facing the one side surface of the blade portion 220 may be provided in an entirely blocked plate, while an inner side surface 5411 of the first main body 541 facing the one side surface of the blade portion 220 may be provided with a scattered reflection inducing portion 5411*a* for reflecting the washing water toward the one side surface of the blade portion 220. The detailed configuration of the scattered reflection inducing portion 5411*a* will be described later with reference to FIG. 24 and FIG. 25.

Figure 6:
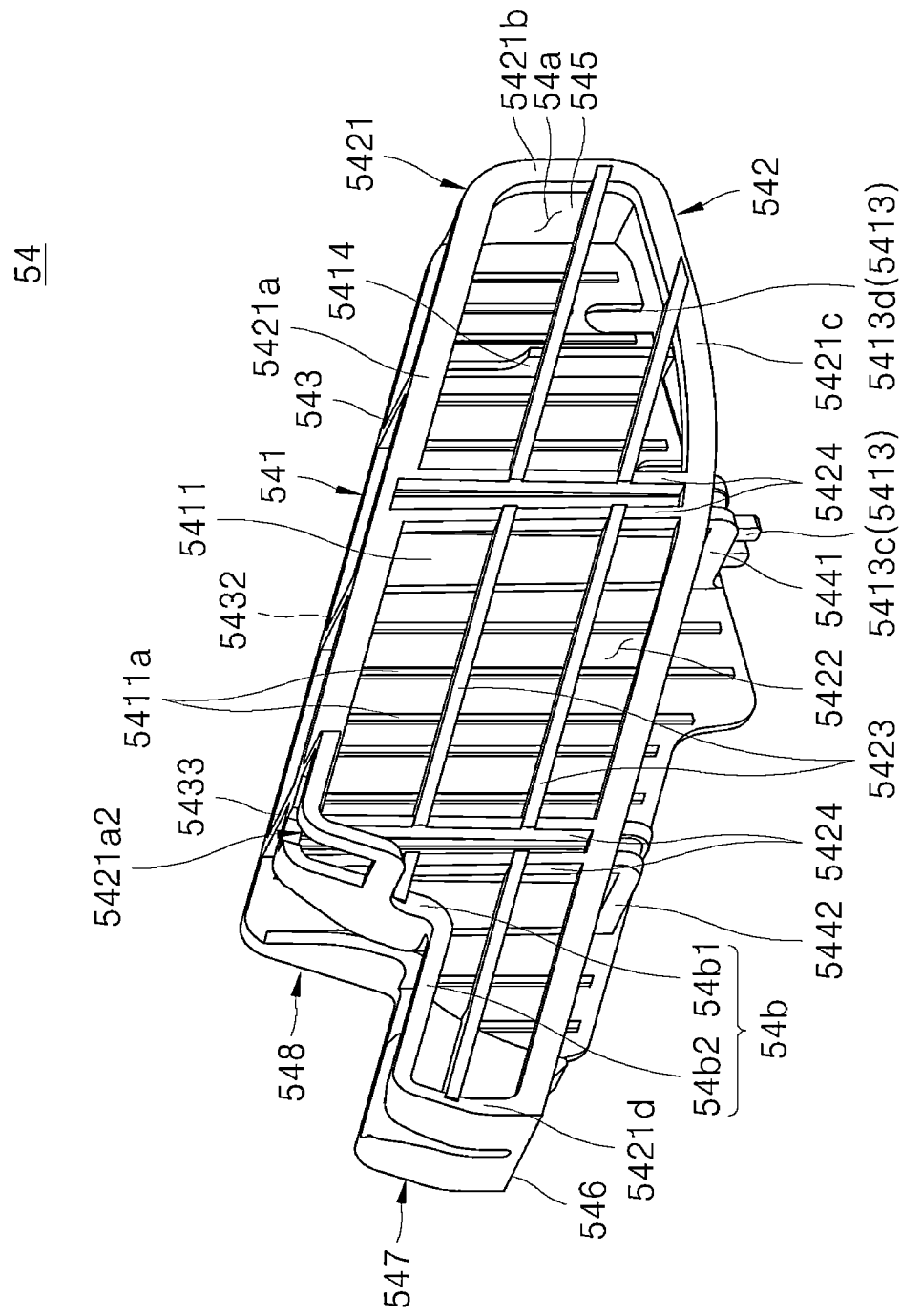
FIG. 6 is a front perspective view of the knife rack in FIG. 4 with the knife removed therefrom.

Referring to FIG. 6 and subsequent drawings, a detailed configuration of the knife rack 54 included in the dish washer 1 according to an embodiment of the present disclosure is described.

As described above, the knife rack 54 serves to store therein the kitchen knife 200 and stably hold the kitchen knife 200 on the lower rack 51.

In this regard, the blade portion 220 of the knife 200 needs to be entirely accommodated in the receiving space 54*a* of the knife rack 54 to prevent other dishes from being damaged by the sharp blade or to prevent the blade of the blade portion 220 being damaged by other dishes.

As shown, the blade portion 220 of the kitchen knife 200 used at home, such as a cooking knife and a fruit knife may be generally composed of a vertical dimension varying portion whose a vertical dimension gradually increases as the blade portion extends toward the handle, and a vertical dimension constant portion whose a vertical dimension is substantially constant as the blade portion extends toward the handle.

The vertical dimension varying portion constitutes a front end of the blade portion 220, and the vertical dimension constant portion may extend from the vertical dimension varying portion toward a front end of the handle 210 and may be integrally formed with the vertical dimension varying portion.

The handle 210 may extend from a rear end of the vertical dimension constant portion of the blade portion 220. An upper end of the handle 210 may extend linearly from the spine as the upper end of the blade portion 220.

In one example, in a commercially available kitchen knife 200, a length of the blade portion 220 is known to range generally from 150 mm to 300 mm, and a length of the handle 210 is known to range generally from 130 mm to 150 mm. Furthermore, the maximum vertical dimension of the blade portion 220 is known to be generally in a range of 50 mm to 55 mm, and the maximum thickness of the blade portion 220 is known to be generally in a range of 1 mm to 2 mm.

In consideration of the general shape and size of each of the blade portion 220 and the handle 210 of the knife 200, the knife rack 54 may have the receiving space 54a and an outer appearance in a shape of a sheath that may accommodate therein the blade portion 220 which has a generally average size of the blade portion of the commercially available kitchen knife 200.

In one example, the generally average size of the blade portion 220 of the commercially available kitchen knife 200 may be as follows: 240 mm in a length, 52 m in the maximum vertical dimension, and 1.5 mm in the maximum thickness. FIG. 5 shows a state in which the kitchen knife 200 of the approximately average size has been stored in the knife rack 54.

The receiving space 54a and the outer appearance having the sheath-shape of the knife rack 54 may be defined by the first main body 541 and the second main body 542.

The first main body 541 serves to define one side surface of the receiving space 54a into which the blade portion 220 is inserted. Based on the state shown, one side surface of the receiving space 54a may be the left side surface. Accordingly, the inner side surface 5411 of the first main body 541 may define a left boundary of the receiving space 54a.

The first main body 541 may be entirely blocked except for an inverted U-shaped groove formed at a lower end thereof, and may have a flat plate shape with a uniform thickness. As described later, the inverted U-shaped groove may act as a fourth mount part 5413d.

An upper end edge 541a of the first main body 541 may have a linear extension section that extends linearly while extending from a front end to a rear end thereof, and a step section continuously extending from the linear extension section.

The step section of the first main body 541 may constitute a left boundary of a step 54b on which the handle 210 is mounted. A right border of the step 54b may be defined by a step section of the second main body 542, which will be described later.

Figure 7:
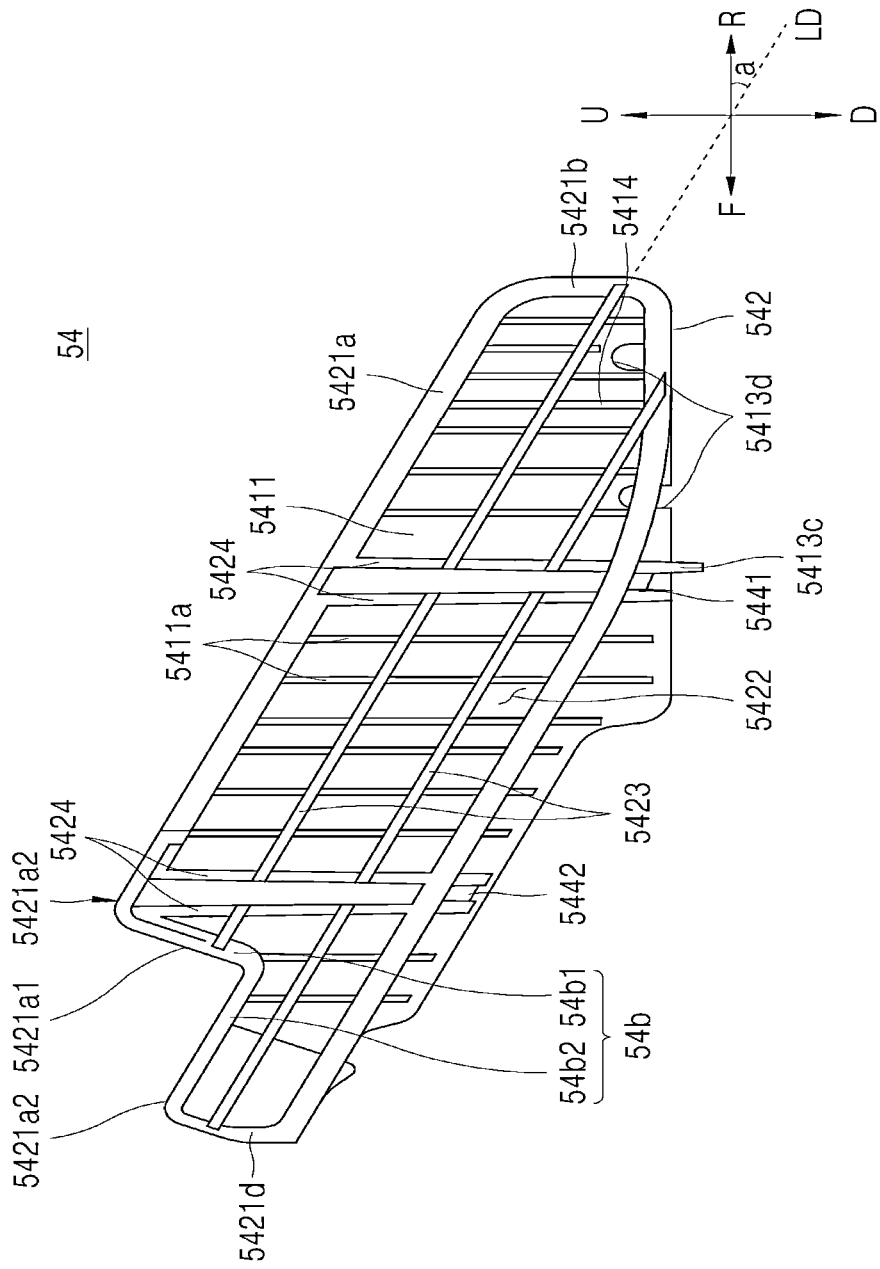
FIG. 7 is a right side view of FIG. 6.

As shown in FIG. 6 and FIG. 7, the linear extension section of the upper end edge 541a defines a predetermined upward inclination angle with respect to the horizontal direction while extending from the front end to the rear end. In other words, the linear extension section may define a predetermined downward inclination angle with respect to the horizontal direction as the linear extension section extends from the rear end to the front end. This downward inclination angle may be set to be approximately equal to a downward inclination angle a defined between each of a longitudinal direction of the blade portion 220 and the extension direction of the receiving space and the horizontal direction in a state in which the blade portion 220 has been stored in the receiving space 54a.

In one example, the step section extending from the linear extension section includes a first edge 541a1 extending downwards from the rear end of the linear extension section of the upper end edge 541a, and a second edge 541a2 extending from the first edge 541a1.

As shown, the first edge 541a1 may linearly extend downwardly along a direction perpendicular to the extension direction of the linear extension section.

Furthermore, the second edge 541a2 may extend from a lower end of the first edge 541a1 toward the rear end linearly along a direction parallel to the linear extension section.

As shown in FIG. 5, the first edge 541a1 of the first main body 541 and a first edge 5421a1 of the second main body 542, which will be described later may constitute a front end 54b2 of the step 54b which acts as a stopper contacting a front end of the handle 210 to prevent forward movement of the knife 200 after the insertion and mounting of the blade portion 220 into the receiving space 54a has been completed.

Furthermore, the second edge 541a2 of the first main body 541 and a second edge 5421a2 of the second main body 542, which will be described later may constitute a lower end 54b1 of the step 54b which may contact an outer peripheral surface of the handle 210 so that the handle 210 is held on the lower end 54b1 of the step 54b after the insertion and mounting of the blade portion 220 into the receiving space 54a has been completed.

In one example, a lower end edge 541c of the first main body 541 may include a horizontal extension section extending linearly in the horizontal direction while extending from the front end to the rear end, and an upward extension section that extends continuously from the horizontal extension section upwardly as the lower end edge 541c extends toward the rear end. In a similar manner to the step section of the upper end edge 541a described above, the upward extension section may be connected to the rear end of the horizontal extension section while a step may be defined between the horizontal extension section and the upward extension section. An upward inclination angle of the upward extension section may be set to be approximately equal to the upward inclination angle of the linear extension section of the above-described upper end edge 541a.

The inner side surface 5411 of the first main body 541 may be provided in the form of an entirely blocked barrier and may be approximately parallel to an inner side surface of the second main body 542, which will be described later.

As the inner side surface 5411 of the first main body 541 is provided in the form of the entirely blocked barrier, the inner side surface 5411 of the first main body 541 reflects the washing water flowing thereto from the upper end and the lower end of the receiving space 54a therefrom toward one side surface of the blade portion 220. Thus, the inner side surface 5411 of the first main body 541 may function as a washing water reflector.

As shown in FIG. 6 and FIG. 7, a scattered reflection inducing portion 5411a may be formed on the inner side surface 5411 of the first main body 541 and may be integrally formed therewith, and may act as a means to increase the reflection and scattering effect of the washing water therefrom.

FIG. 6 and FIG. 7 shows an embodiment in which the scattered reflection inducing portion 5411a includes a plurality of bar-shaped ribs that have an approximately uniform thickness and extend linearly along the vertical direction.

However, embodiments of the present disclosure are not limited thereto, and the scattered reflection inducing portion 5411a may include a plurality of ribs or a plurality of grooves having various cross-sectional shapes, as will be described later.

In one example, a stopper rib 5414 may be further disposed on the inner side surface 5411 of the first main body 541. The stopper rib 5414 serves to limit a rotation range of the front end of the blade portion 220 when the blade portion 220 has been stored in the receiving space 54a.

In one example, the stopper rib 5414 may be embodied as a wall-shaped rib that protrudes from the inner side surface 5411 of the first main body 541 toward the front end of the blade portion 220.

Furthermore, the stopper rib 5414 may be formed integrally with one of the plurality of ribs constituting the scattered reflection inducing portion 5411*a*, and may be formed by further extending a lower end of the one rib toward the receiving space 54*a*.

As the wall-shaped stopper rib 5414 is disposed on the inner side surface 5411 of the first main body 541, a following effect may be achieved. Even when the blade portion 220 rotates toward the inner side surface of the first main body 541 due to the impact applied to the handle 210 in a state in which the blade portion 220 has been stored in the receiving space 54*a*, the front end of the blade portion 220 first comes into contact with the stopper rib 5414, such that the rotation of the blade portion 220 may be limited due to the stopper rib 5414. Accordingly, the front end of the blade portion 220 may be effectively prevented from colliding with the inner side surface 5411 of the first main body 541.

In one example, as described above, the knife rack 54 is disposed closer to the left side surface of the lower rack 51. Therefore, an outer side surface 5412 of the first main body 541 of the knife rack 54 facing the left side surface of the lower rack 51 may have a mount 5413 integrally formed therewith. The mount 5413 may act as a coupling means for coupling the knife rack 54 to the lower rack 51.

In one example, the mount 5413 may be configured to include a first mount part 5413*a* and a second mount part 5413*b* arranged along the vertical direction and disposed on the outer side surface 5412 of the first main body 541, third mount parts 5413*c* extending downwards from a first lower bridge rib 5441 as described later extending from a lower end edge 541*c* of the outer side surface 5412 of the first main body 541, and arranged so as to be spaced from each other along a length direction of the first lower bridge rib 5441, and a fourth mount part 5413*d* defined in a groove shape in the lower end edge 541*c* of the first main body 541.

In one example, the first mount part 5413*a* may include a pair of ribs, each having one end as a fixed end connected to the outer side surface 5412 of the first main body 541 and the other end as a free end.

Figure 8:
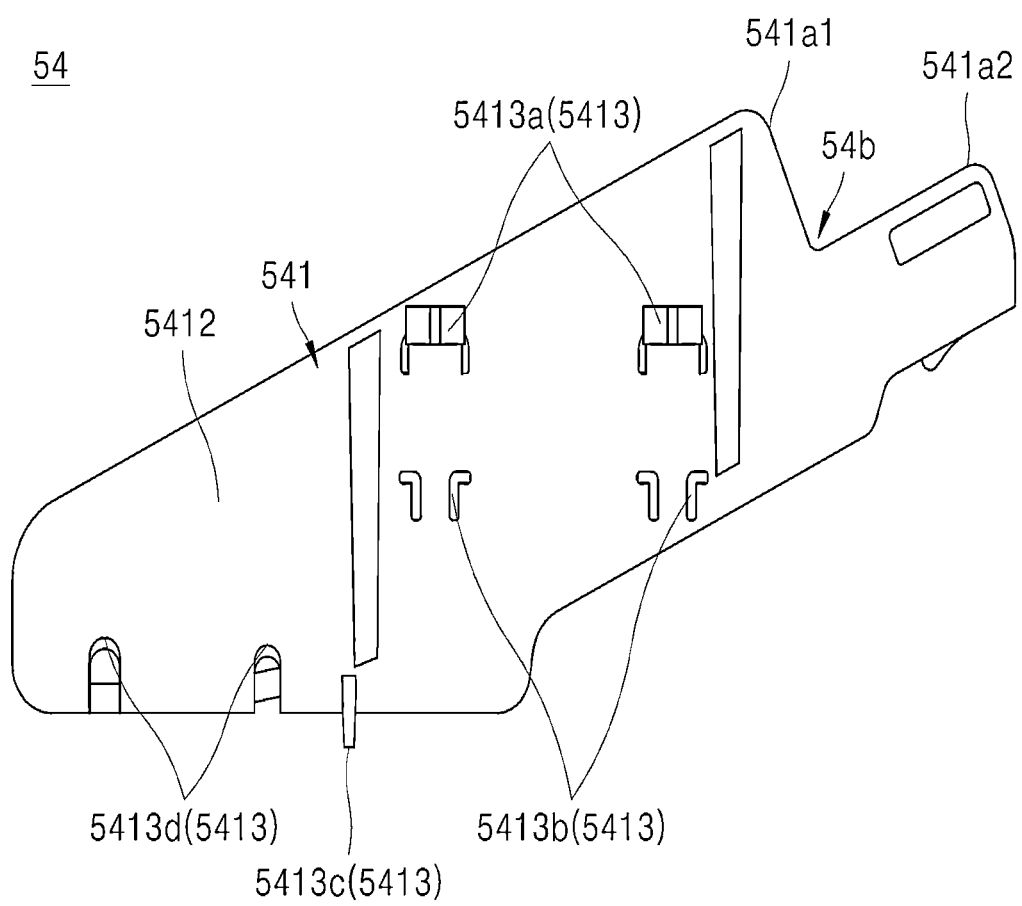
FIG. 8 is a left side view of FIG. 6.
Figure 9:
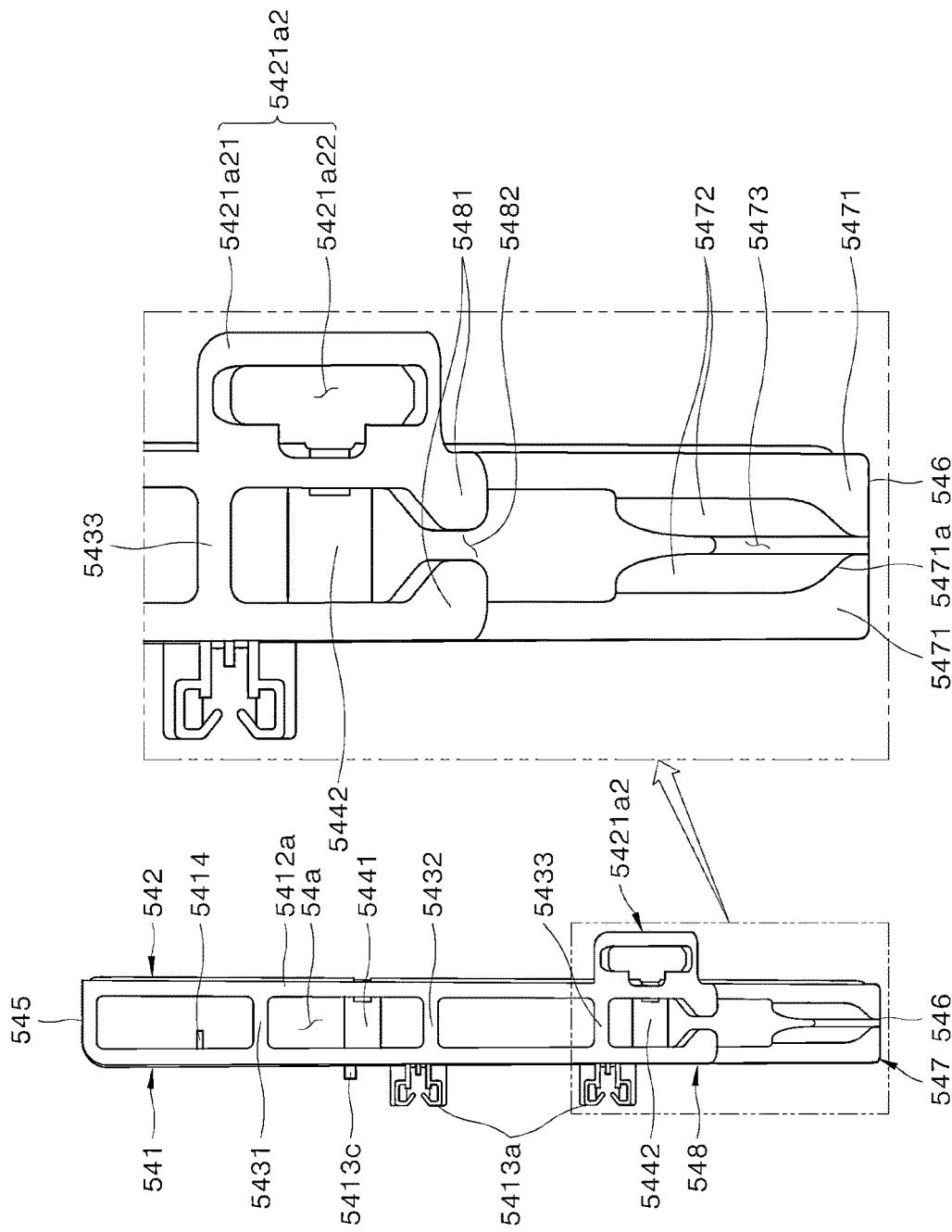
FIG. 9 is a plan view of FIG. 6.

As shown in FIG. 8 and FIG. 9, a horizontal dimension between the pair of ribs constituting the first mount part 5413*a* may be variable as the ribs extend in a direction perpendicular to the outer side surface 5412. More specifically, a horizontal dimension between the respective other ends of the ribs may be smaller than a horizontal dimension between the respective one ends of the ribs. In this regard, the horizontal dimension between the respective other ends of the ribs may be smaller than a thickness of the wire 513 of the lower rack 51.

Therefore, when the wire 513 is coupled to the first mount part 5413*a*, the first mount part 5413*a* may be elastically coupled to the wire 513 in a manner such that the wire 513 extending along the vertical direction is inserted into a gap between the pair of ribs.

In one example, as shown in FIG. 8 and FIG. 9, two first mount parts 5413*a* may be respectively positioned at two locations on the outer side surface 5412 of the first main body 541.

In a similar manner to the first mount part 5413*a*, the second mount part 5413*b* be composed of a pair of ribs, each having one end as a fixed end connected to the outer side surface 5412 of the first main body 541 and the other end as a free end.

However, as shown in FIG. 8 and FIG. 9, the horizontal dimension between the pair of ribs constituting the second mount part 5413*b* may be constant as the ribs extend in a direction perpendicular to the outer side surface 5412 and may be equal to the thickness of the wire 513 extending along the vertical direction.

The second mount part 5413*b* may be disposed at a position spaced downwardly from the first mount part 5413*a*. Therefore, the wire 513 may be coupled to both the first mount part 5413*a* and the second mount part 5413*b*.

In one example, as shown, when the first mount part 5413*a* is disposed at each of two locations, the second mount part 5413*b* may be disposed at each of two locations overlapping therewith.

The coupling between the first mount part 5413*a* and the second mount part 5413*b* and the wire 513 of the lower rack 51 may provide longitudinal and vertical restricting force to restrict the knife rack 54 in the longitudinal and vertical directions.

In one example, the third mount part 5413*c* may be embodied as a plate-shaped rib having an upper end as a fixed end integrally connected to the lower end edge 541*c* of the first main body 541 and the first lower bridge rib 5441, and a lower end as a free end.

As shown in FIG. 6 to FIG. 8, the third mount part 5413*c* may extend along the vertical direction of the knife rack 54. A vertical level of a lower end of the third mount part 5413*c* may be lower than a vertical level of the horizontal extension section of the lower end edge 541*c* of the first main body 541.

An inverted U-shaped groove facing downwardly may be formed in the third mount part 5413*c*. When the knife rack 54 is coupled to the wire 513, the wire 513 which constitutes a bottom surface of the lower rack 51 and extends along the front-rear direction may be inserted into the inverted U-shaped groove.

A left-right directional restricting force to restrict the knife rack 54 in the left-right direction may be achieved via the combination between the inverted U-shaped groove and the wire 513 extending along the front-rear direction.

In one example, the fourth mount part 5413*d* may be embodied as an inverted U-shaped groove extending upwardly from the lower end edge 541*c* of the first main body 541. In one example, the fourth mount part 5413*d* may be formed in the horizontal extension section of the lower end edge 541*c* of the first main body 541.

In a similar manner to the third mount part 5413*c*, when the knife rack 54 is coupled to the wire 513, the wire 513 which defines the bottom surface of the lower rack 51 and extends in the left-right direction may be inserted into the inverted U-shaped groove of the fourth mount part 5413*d*.

Thus, a front-rear directional restricting force to restrict the knife rack 54 in the front-rear direction may be achieved via the coupling between the inverted U-shaped groove of the fourth mount part 5413*d* and the wire 513 extending along the left-right direction.

In one example, the second main body 542 serves to define the other side surface of the receiving space 54*a* into which the blade portion 220 is inserted. Based on the state shown, the other side surface of the receiving space 54*a* may be the right side surface. Accordingly, the inner side surface of the second main body 542 may form the right boundary of the receiving space.

The second main body 542 may be spaced apart from the first main body 541 in the horizontal direction by a spacing corresponding to the horizontal dimension of the receiving space 54*a*.

In this regard, as shown in FIG. 5, the horizontal dimension of the receiving space 54*a* may be larger than the thickness of the blade portion 220 and smaller than the thickness of the handle 210.

The second main body 542 may be formed to have the opening 5422 that is open toward the lower rack 51 and is open across an entire area thereof except for the edge 5421 defining the outer boundary. In this regard, the opening 5422 of the second main body 542 may receive therein a longitudinal rib 5423 formed integrally with the second main body 542 and extending along the longitudinal direction of the second main body 542 and a transverse rib 5424 formed integrally with the second main body 542 and extending along the vertical direction thereto.

The longitudinal rib 5423 and the transverse rib 5424 serve to prevent the blade portion 220 stored in the receiving space 54*a* from being removed therefrom and to prevent the blade portion 220 from colliding with other dishes stored in the lower rack 51.

Furthermore, the longitudinal rib 5423 and the transverse rib 5424 may extend across the opening 5422 of the second main body 542 and may serve to reinforce the rigidity of the second main body 542.

The transverse rib 5424 may be embodied as a bar-shaped rib extending along the vertical direction from the upper end edge 5421*a* to the lower end edge 5421*c* of the second main body 542.

FIG. 6 and subsequent drawings show an example in which the number of the transverse ribs 5424 is four and the number of the transverse ribs is two.

A space between the pair of transverse ribs 5424 arranged in this way in the vertical direction may be maintained in an open state. Thus, the rigidity of the second main body 542 which may be vulnerable to a vertical directional load may be effectively strengthened, while a space through which the washing water may flow into the receiving space 54*a* may be secured.

The other end of a first lower bridge rib 5441 and the other end of a second lower bridge rib 5442, which will be described later may be integrally connected to the lower end of the transverse rib 5424, so that the rigidity of the second main body 542 may be additionally secured.

The longitudinal rib 5423 may be embodied as a bar-shaped rib extending across the opening 5422 and along the longitudinal direction of the blade portion 220 or the longitudinal direction of the receiving space 54*a*. FIG. 5 and subsequent drawings shows a configuration in which a pair of longitudinal ribs 5423 are spaced apart from each other along the vertical direction.

In this regard, each of the longitudinal ribs 5423 may be broken in an area between a pair of transverse ribs 5424 arranged in close proximity to each other so that the space between the pair of transverse ribs 5424 arranged in close proximity to each other may be entirely opened.

However, this is only an example, and the number, shape, and arrangement of the longitudinal ribs 5423 may vary depending on the shape and size of the knife rack 54.

In one example, in a similar manner to the first main body 541, the upper end edge 5421*a* which constitutes the edge 5421 of the second main body 542 may have a linear extension section that extends linearly from the front end to the rear end, and a step section extending continuously from the linear extension section.

The step section of the second main body 542 may define the right boundary of the step 54*b* on which the handle 210 is mounted. The left boundary of the step 54*b* may be defined by the step section of the first main body 541 as described above.

As shown in FIG. 6 and FIG. 7, the linear extension section of the upper end edge 5421*a* may define a predetermined upward inclination angle with respect to the horizontal direction while extending from the front end to the rear end. Similarly to the first main body 541, the linear extension section of the second main body 542 may define a predetermined downward inclination angle with respect to the horizontal direction while extending from the rear end to the front end.

In one example, the step section extending from the linear extension section includes a first edge 5421*a*1 extending downwardly from the rear end of the linear extension section, and a second edge 5421*a*2.

As shown, the first edge 5421*a*1 may linearly extend downwardly along a direction perpendicular to the linear extension section.

Furthermore, the second edge 5421*a*2 may extend linearly along a direction parallel to the linear extension section from the lower end of the first edge 5421*a*1 toward the rear end.

As described above, the first edge 541*a*1 of the first main body 541 and the first edge 5421*a*1 of the second main body 542 may constitute the front end 54*b*2 of the step 54*b* which contacts the front end of the handle 210 to act as a stopper to stop the movement of the knife 200 after the insertion of the blade portion 220 into the receiving space 54*a* has been completed. To this end, the first edge 541*a*1 of the first main body 541 and the first edge 5421*a*1 of the second main body 542 may have approximately the same extension length and be parallel to each other.

Furthermore, as described above, the second edge 541*a*2 of the first main body 541 and the second edge 5421*a*2 of the second main body 542 may constitute the lower end 54*b*1 of the step 54*b* which contacts the outer peripheral surface of the handle 210 and supports the handle 210 thereon after the insertion of the blade portion 220 into the receiving space 54*a* has been completed. To this end, the second edge 541*a*2 of the first main body 541 and the second edge 5421*a*2 of the second main body 542 may have approximately the same extension length and be parallel to each other.

The lower end edge 5421*c* of the second main body 542 may have a horizontal extension section which extends linearly along the horizontal direction from the front end to the rear end, and an upward extension section that extends from the horizontal extension section, and extends upwardly toward the rear end. However, unlike the first main body 541, a step may not be formed between the horizontal extension section and the upward extension section of the second main body 542. The lower end edge 5421*c* of the second main body 542 may have an outer appearance similar manner to a blade shape of the lower end of the blade portion 220 in a corresponding manner to the outer appearance of the blade portion 220.

In one example, the knife rack 54 may further include an additional holder 5421*a*2 on which other types of cooking tools, such as scissors, etc. may be held.

In one example, the additional holder 5421*a*2 may be connected to the outer side surface of the edge 5421 constituting the second main body 542 and may extend therefrom in a direction away from the receiving space 54*a*.

More specifically, the additional holder 5421*a*2 may include an outward extension portion 5421*a*21 having one end integrally connected to the edge 5421 of the second main body 542, and the other end extending horizontally along a direction away from the receiving space 54a.

As shown in FIG. 6 and FIG. 7, the outward extension portion 5421a21 may have a flange surface shape having an inverted L shape in which a portion of the outward extension portion 5421a21 protrudes from the upper end edge 5421a of the second main body 542, while the remaining portion of the outward extension portion 5421a21 protrudes from the first edge 5421a1 of the step edge of the second main body 542.

In this regard, a through-hole 5421a22 may be defined to extend through the outward extension portion 5421a21.

The through-hole 5421a22 may include a portion extending through the portion of the outward extension portion 5421a21 horizontally extending from the upper end edge 5421a of the edge 5421 and a portion extending through the portion of the outward extension portion 5421a21 horizontally extending from the first edge 5421a1 of the step edge of the second main body 542. Therefore, the through-hole 5421a22 may have an inverted L-shape corresponding to the shape of the outward extension portion 5421a21. One of a pair of blade portions constituting the scissors may be inserted into the through-hole 5421a22. Thus, the scissors may be stably held on the additional holder 5421a2 in a non-overlapping state of the two blade portions.

Figure 16:
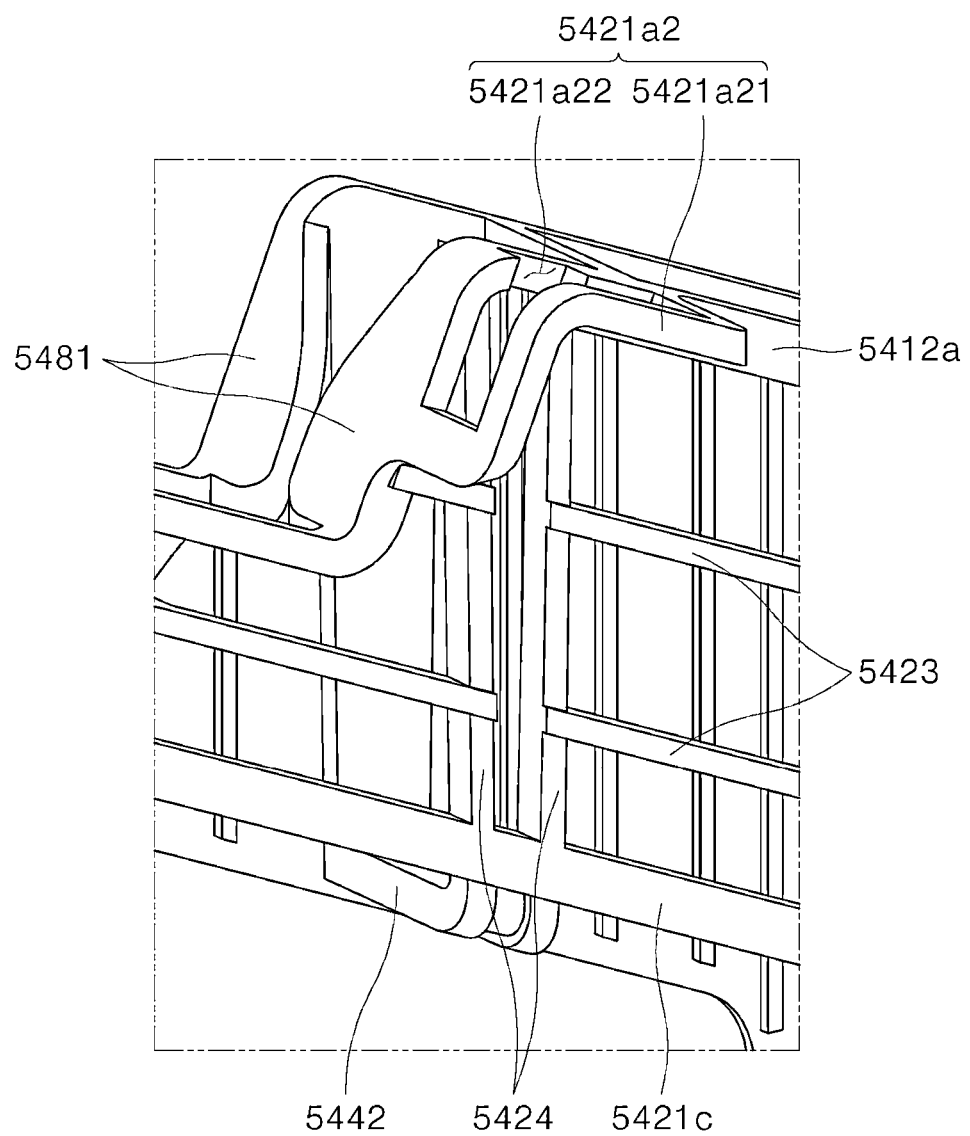
FIG. 16 is a partial enlarged view of FIG. 6 for illustrating an additional holder included in the knife rack.

The detailed configuration of the additional holder 5421a2 will be described later with reference to FIG. 16 to FIG. 18.

In one example, the knife rack 54 may further include an upper bridge rib 543 connecting the upper end edge 541a of the first main body 541 and the upper end edge 5421a of the second main body 542 to each other, a lower bridge rib 544 connecting the lower end edge 541c of the first main body 541 and the lower end edge 5421c of the second main body 542 to each other, a front bridge rib 545 connecting the front edge of the first main body 541 and the front edge 5421b of the second main body 542 to each other, and a rear bridge rib 546 connecting the rear edge of the first main body 541 and the rear edge 5421d of the second main body 542 to each other.

The upper bridge rib 543 serves to maintain a spacing between the upper end edge 541a of the first main body 541 and the upper end edge 5421a of the second main body 542.

Furthermore, the upper bridge rib 543 may be disposed between the linear extension section of the first main body 541 as the longest section of the upper end edge 541a of the first main body 541 and the linear extension section of the second main body 542 as the longest section of the upper end edge 5421a of the second main body 542.

As shown in FIG. 9, the upper bridge rib 543 may be embodied as a bar-shaped rib extending in parallel to a width direction of the receiving space 54a.

In this regard, for smooth inflow of the washing water through the upper end of the receiving space 54a into the receiving space, a dimension of the upper bridge rib 543 along the longitudinal direction of the receiving space 54a may be smaller than a dimension thereof along a width direction of the receiving space 54a.

However, since the dimension of the upper bridge rib 543 along the longitudinal direction of the receiving space 54a is very small, a plurality of upper bridge ribs 543 may be disposed to ensure sufficient connection strength.

In an embodiment, a configuration in which a total of three upper bridge ribs 543 are arranged to be spaced apart along the longitudinal direction of the receiving space 54a is shown. However, embodiments of the present disclosure are not limited thereto. Following descriptions are based on a configuration in which the three upper bridge ribs 543 are arranged.

The upper bridge rib 543 may include a first upper bridge rib 5431 as the frontmost upper bridge rib disposed closer to the front bridge rib 545, a second upper bridge rib 5432 disposed at a middle position and in rear of the first upper bridge rib 543, and a third upper bridge rib 5433 disposed closest to the step 54b.

As shown in FIG. 9, in order to maintain uniform connection strength between the first main body 541 and the second main body 542, a spacing between the front bridge rib 545 which will be described later and the first upper bridge rib 5431, a spacing between the first upper bridge rib 5431 and the second upper bridge rib 5432, and a spacing between the second upper bridge rib 5432 and the third upper bridge rib 5433 may be set to be approximately equal to each other.

However, the third upper bridge rib 5433 located closest to step 54b may be disposed at a position spaced apart from the step 54b by a predetermined spacing.

Thus, the blade portion 220 may be inserted into the receiving space 54a in a state in which the handle 210 is lifted upwardly. Further, a predetermined elasticity may be imparted to a pair of second guide surfaces 5481 constituting the second guide 548, which will be described later.

However, in order to prevent the blade portion 220 from being separated from the knife rack when the handle 210 is subjected to a load lifting upwardly the handle when the knife 200 has been entirely stored in the knife rack, a longitudinal spacing between the third upper bridge rib 5433 and the step 54b may be set to be a value within 150 mm in consideration of the average length of the blade portion 220. The longitudinal spacing may be smaller than an average length of the handle 210 of the knife 200.

In one example, the lower bridge rib 544 serves to maintain a spacing between the lower end edge 541c of the first main body 541 and the lower end edge 5421c of the second main body 542.

As shown in FIG. 7 and FIG. 9, the lower bridge rib 544 may be a bar-shaped rib extending in parallel to the width direction of the receiving space 54a.

However, as described later, in a state in which the blade portion 220 is being inserted into the receiving space 54a and in a state in which the insertion of the blade portion 220 into the receiving space 54a has been completed, an upper surface of the lower bridge rib 544 is in direct contact with the blade as the lower end of the blade portion 220.

Therefore, in consideration of contact of the lower bridge rib 544 with the blade portion 220, it is necessary to form the lower bridge rib 544 so as to have greater strength than that of the upper bridge rib 543 as described above.

For this purpose, a dimension of the lower bridge rib 544 in the longitudinal direction of the blade portion 220 may be larger than a dimension of the upper bridge rib 543 in the longitudinal direction of the blade portion 220.

However, like the upper bridge rib 543, a plurality of lower bridge ribs 544 may be arranged to ensure sufficient connection strength between the first and second main bodies 541 and 542.

In an embodiment, a configuration in which a total of two lower bridge ribs 544 are arranged to be spaced apart from each other along the longitudinal direction of the receiving space 54a is shown. However, embodiments of the present disclosure are not limited thereto. Following descriptions are based on a configuration in which two lower bridge ribs 544 are arranged.

The lower bridge rib 544 may include a first lower bridge rib 5441 disposed closer to the front end and close to the front bridge rib 545, and a second lower bridge rib 5442 disposed in rear of the first lower bridge rib 5441.

The first lower bridge rib 5441 may be disposed at a position at which the upward extension section of the lower end edge 5421c of the second main body 542 starts to extend.

The second lower bridge rib 5442 may be connected to the upward extension section of the lower end edge 5421c of the second main body 542, and may be closer to the rear bridge rib 546, which will be described later.

As described above, in order to additionally secure the connection strength of the lower bridge rib 544 to the second main body 542 and the rigidity of the second main body 542, the other end of the first lower bridge rib 5441 and the other end of the second lower bridge rib 5442 may be connected to the second main body 542 respectively at positions thereof at which the second main body 542 is connected to the lower ends of the transverse ribs 5424.

In one example, the rear bridge rib 546 serves to connect the rear end of the first main body 541 and the rear end of the second main body 542 to each other.

More specifically, the rear bridge rib 546 may extend from the rear edge of the first main body 541 and the rear edge 5421d of the second main body 542 toward the second lower bridge rib 5442 along the upward extension section.

Furthermore, the rear bridge rib 546 may be constructed to block a lower end 5473a of a first slot 5473, which will be described later, and may extend along the longitudinal direction of the receiving space 54a by a length equal to an extension length of the first slot 5473.

In this way, the rear bridge rib 546 may be constructed to block the lower end 5473a of the first slot 5473 and may extend along the longitudinal direction of the receiving space 54a by a length equal to an extension length of the first slot 5473, such that the connection strength between the rear end of the first main body 541 and the rear end of the second main body 542 may be improved. Further, as will be described later, when the blade portion 220 moves for the insertion into the receiving space 54a, the rear bridge rib 546 may also serve as a guide to a sliding movement of the blade portion 220.

However, as shown in FIG. 7 and FIG. 9, the length by which the rear bridge rib 546 extends in the longitudinal direction of the receiving space 54a may be smaller than a length of the lower end of the step 54b.

Accordingly, the first slot 5473, the rear bridge rib 546, and a second slot 5482, which will be described later may be arranged along the longitudinal direction of the receiving space 54a and may be separated from each other.

As will be described later, a portion of the receiving space 54a positioned between the rear bridge rib 546 and the second slot 5482 may be entirely open in the vertical direction, that is, upper and lower surfaces of the portion may be entirely open.

In one example, in order to smoothly guide the sliding movement of the blade portion 220 due to the knife 200's own weight when the blade portion 220 is inserted into the receiving space 54a for holding the knife 200, the rear bridge rib 546, the first lower bridge rib 5441 and the second lower bridge rib 5442 may be arranged in the same extension line, as shown in FIG. 7.

In this regard, a virtual extension line passing through am upper surface of the rear bridge rib 546, an upper surface of the first lower bridge rib 5441, and an upper surface of the second lower bridge rib 5442 may extend in parallel to the longitudinal direction of the receiving space 54a.

Therefore, the virtual extension line may define a predetermined downward inclination angle a with respect to the horizontal direction as the virtual extension line extends from the rear end to the front end.

In one example, the front bridge rib 545 serves to connect the front end of the first main body 541 and the front end of the second main body 542 to each other.

In order to provide sufficient connection strength between the front end of the first main body 541 and the front end of the second main body 542, as shown in FIG. 6, the front bridge rib 545 may be constructed to connect an entirety of the front edge of the first main body 541 and an entirety of the front edge 5421b of the second main body 542 to each other.

More specifically, the front bridge rib 545 may be embodied as a rib in a form of a vertical barrier having one end connected to the front edge of the first main body 541 and the other end connected to the front edge 5421b of the second main body 542.

In one example, the knife rack 54 included in the dish washer 1 according to one embodiment of the present disclosure may further include a first guide 547 and a second guide 548 that serve to guide the insertion direction of the blade portion 220 of the knife 200.

First, the first guide 547 serves to guide the movement of a lower portion of the blade portion 220 when the blade portion 220 moves so as to be inserted in the receiving space 54a.

Figure 10:
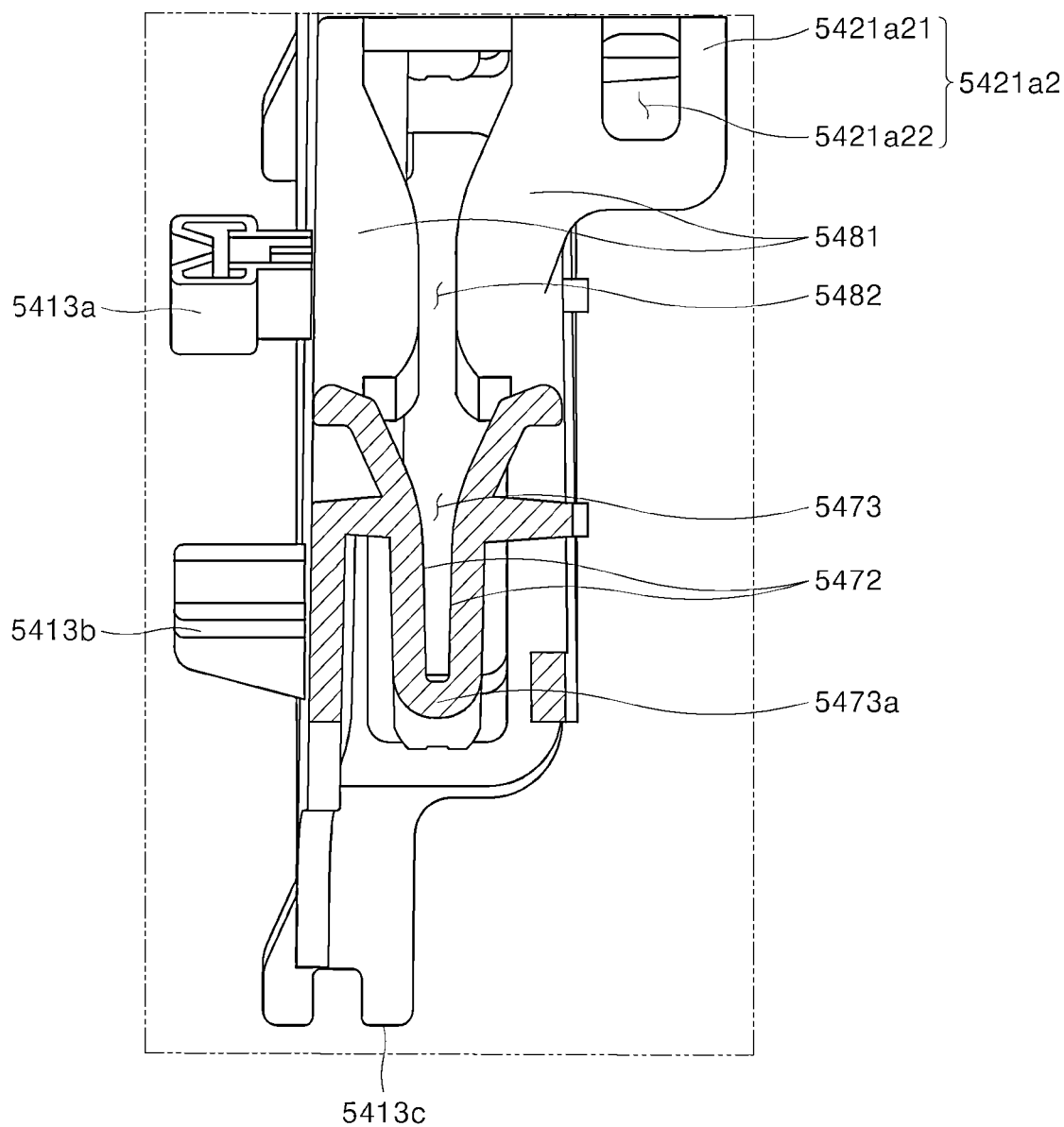
FIG. 10 is a cross-sectional view of a first guide that constitutes the knife rack as cut along a direction perpendicular to a longitudinal direction of the knife.

As shown in FIG. 9 and FIG. 10, the first guide 547 may be formed under the lower end 54b1 of the step 54b to guide the movement of the lower portion of the blade portion 220.

More specifically, the first guide 547 may include an end surface 5471 having one end connected to the rear edge of the first main body 541 and the other end connected to the rear edge 5421d of the second main body 542.

As shown, the end surface 5471 of the first guide 547 may extend along the rear edge of the first main body 541 and the rear edge 5421d of the second main body 542 so as to connect the entirety of the rear edge 5421d of the second main body 542 and the entirety of the rear edge of the first main body 541 extending along a direction intersecting the longitudinal direction of the receiving space 54a to each other.

In this regard, the end surface 5471 of the first guide 547 may have a guide groove 5471a defined therein having an upper end being open and a lower end being blocked.

The guide groove 5471a may include a horizontal width decreasing portion whose a horizontal width generally gradually decreases and a horizontal width constant portion whose a horizontal width is generally constant.

In this regard, the horizontal width decreasing portion may be disposed on top of the horizontal width constant portion. Therefore, the guide groove 5471a may have a generally Y-shape.

However, the horizontal width of the horizontal width constant portion may be set to be slightly larger than an average thickness of the blade portion 220 so that the sliding movement of the blade portion 220 may be performed smoothly.

As shown, the guide groove 5471a may define a rear end of the first slot 5473, which will be described later, that is, an inlet of the first slot 5473.

In one example, the first guide 547 may further include a first guide surface 5472 extending from the lower end 54b1 of the step 54b to the rear bridge rib 546.

The first guide surface 5472 may be embodied as a pair of first guide surfaces arranged in a line symmetry manner with each other, and facing each other and being spaced apart from each other.

A space may be defined between the pair of first guide surfaces 5472 spaced apart from each other. This space may act as a symmetrical first slot 5473 that guides the sliding movement of the blade portion 220 in a state in which the blade portion 220 stands upright such that the spine thereof faces upwardly and the blade thereof faces downwardly.

Like the guide groove 5471a, the first slot 5473 may be formed to have a horizontal width decreasing portion whose a horizontal width generally gradually decreases as the first slot extends in the downward direction, and a horizontal width constant portion whose a horizontal width is generally constant as the first slot extends in the downward direction.

More specifically, as shown in FIG. 10, when the first slot 5473 is cut along a cross section perpendicular to the longitudinal direction of the receiving space 54a, a cross section of the first slot 5473 may have the same shape as that of the guide groove 5471a.

That is, the first slot 5473 has an open upper end and a blocked lower end, and may have a Y-shaped cross-sectional shape including a horizontal width decreasing portion and a horizontal width constant portion in a similar manner to the guide groove 5471a. FIG. 6, and subsequent drawings show a configuration in which the first slot 5473 has the Y-shaped cross section. However, embodiments of the present disclosure are not limited thereto, and the shape of the first slot 5473 may be modified into various shapes such as V-shape, U-shape, triangle, etc. in a corresponding manner to various cross-sectional shapes of blade portions of the commercially available knifes. Following descriptions will be made based on the configuration in which each of the first slot 5473 and the second slot 5482 having the Y-shaped cross section.

The cross-sectional shape of the first slot 5473 may be maintained to be approximately constant as the first slot extends from the rear end to the front end of the first guide surface 5472.

Thus, during the sliding movement of the blade portion 220 for insertion of the blade portion 220 into the receiving space 54a under the guidance of the first slot 5473 which has the cross-sectional shape that is maintained approximately constant while extending from the rear end of the first guide surface 5472 to the front end thereof, the movement of the blade portion 220 may be guided so that the blade portion 220 may move in an upright state in which the spine thereof faces upwardly and the blade thereof faces downwardly.

In this regard, as described above, the lower end 5473a of the first slot 5473 is blocked. Therefore, during the sliding movement of the blade portion 220, the lower end of the blade portion 220 may or may not be in contact with the lower end 5473a of the first slot 5473 depending on the thickness of the blade portion 220.

When the lower end of the blade portion 220 comes into contact with the lower end 5473a of the first slot 5473 during the sliding movement of the blade portion 220, wear or damage may occur on the lower end 5473a of the first slot 5473. The portion where the wear and damage occur is screened with the first guide surface 5472. Therefore, even when such wear and damage occur, there is little possibility of adverse aesthetic effects on the user because the user cannot easily check the wear and damage with the naked eye.

In one example, the guide groove 5471a and the first slot 5473 may be formed under the lower end of the step 54b on which the handle 210 is supported. Accordingly, an area of the blade portion 220 positioned at a lower position than a position of the handle 210 based on the vertical direction may be guided by the guide groove 5471a and the first slot 5473.

In one example, the second guide 548 serves to guide the movement of a upper portion of the blade portion 220 when the blade portion 220 moves so as to be inserted in the receiving space 54a.

As shown in FIG. 9 and FIG. 10, the second guide 548 may be formed at the front end 54b2 of the step 54b to guide the movement of the upper portion of the blade portion 220.

As the second guide 548 is formed at the front end 54b2 of the step 54b, the portion of the blade portion 220 guided by the second guide 548 may be an area thereof positioned at a higher position than a position of the lower end surface of the handle 210.

Furthermore, the second guide 548 may be disposed in front of the first guide 547 and may be separated from the first guide 547.

In one example, the second guide 548 may include a pair of second guide surfaces 5481 formed integrally respectively with the first edge 541a1 of the first main body 541 and the first edge 5421a1 of the second main body 542 constituting the front end 54b2 of the step 54b.

One of the pair of second guide surfaces 5481 may be provided in a form of a flange surface that protrudes from the first edge 541a1 of the first main body 541 toward the first edge 5421a1 of the second main body 542.

Furthermore, the other of the pair of second guide surfaces 5481 may be provided in the form of a flange surface protruding from the first edge 5421a1 of the second main body 542 toward the first edge 541a1 of the first main body 541.

In this regard, the pair of second guide surfaces 5481 may be spaced from each other, such that the second slot 5482 may be formed between the pair of second guide surfaces 5481. The second slot 5482 may have a symmetrical shape and extending in a perpendicular manner to the longitudinal direction of the receiving space 54a along the front end 54b2 of the step 54b.

As shown in FIG. 9 and FIG. 10, unlike the above-described first slot 5473, the second slot 5482 may be formed to have an open upper end and an open lower end.

Furthermore, the second slot 5482 may include a horizontal width decreasing portion whose a horizontal width gradually decreases as the second slot extends downwards from the upper ends of the pair of second guide surfaces 5481, a horizontal width constant portion whose a horizontal width is approximately constant as the second slot extends downwards from the upper ends of the pair of second guide surfaces 5481, and a horizontal width increasing portion whose a horizontal width gradually increases as the second slot extends downwards from the upper ends of the pair of second guide surfaces 5481. As shown, the horizontal width decreasing portion, the horizontal width constant portion, and the horizontal width increasing portion may be arranged vertically in that order from the upper end of the second guide surface 5481.

Therefore, in a similar manner to the above-described first slot 5473, the second slot second slot 5482 may have a Y-shaped cross-section in which the horizontal width of the lower end gradually increases.

The second slot 5482 may have a minimum value in the horizontal width in the horizontal width constant portion. The horizontal width of the horizontal width constant portion may be larger than the average thickness of the blade portion 220, and may be substantially equal to the horizontal width of the horizontal width constant portion of the above-described first slot 5473 so that the sliding movement of the blade portion 220 may be performed smoothly along the second slot.

In this regard, a virtual plane passing through both a center line of the horizontal width constant portion of the symmetrical second slot 5482 and a center line of the horizontal width constant portion of the symmetrical first slot 5473 may be parallel to the inner side surface 5411 of the first main body 541 and the inner side surface of the second main body 542, or may define a very small intersection angle with respect to the inner side surface 5411 of the first main body 541 and the inner side surface of the second main body 542.

In this way, the virtual plane may be parallel to the inner side surface 5411 of the first main body 541 and the inner side surface of the second main body 542, or may define a very small intersection angle with respect to the inner side surface 5411 of the first main body 541 and the inner side surface of the second main body 542, such that the virtual plane cannot intersect the inner side surface 5411 of the first main body 541 and the inner side surface of the second main body 542 inside the receiving space 54a.

As a result, the blade portion 220 may be effectively guided such that the front end of the blade portion 220 moves while passing through both the horizontal width constant portion of the first slot 5473 and the horizontal width constant portion of the second slot 5482 does not contact the inner side surface 5411 of the first main body 541 and the inner side surface of the second main body 542 inside the receiving space 54a.

Hereinafter, referring to FIG. 11 and FIG. 12, a state in which the movement of the blade portion 220 is guided through the first slot 5473 and the second slot 5482 when the blade portion 220 is being inserted into the receiving space 54a will be described.

Figure 11:
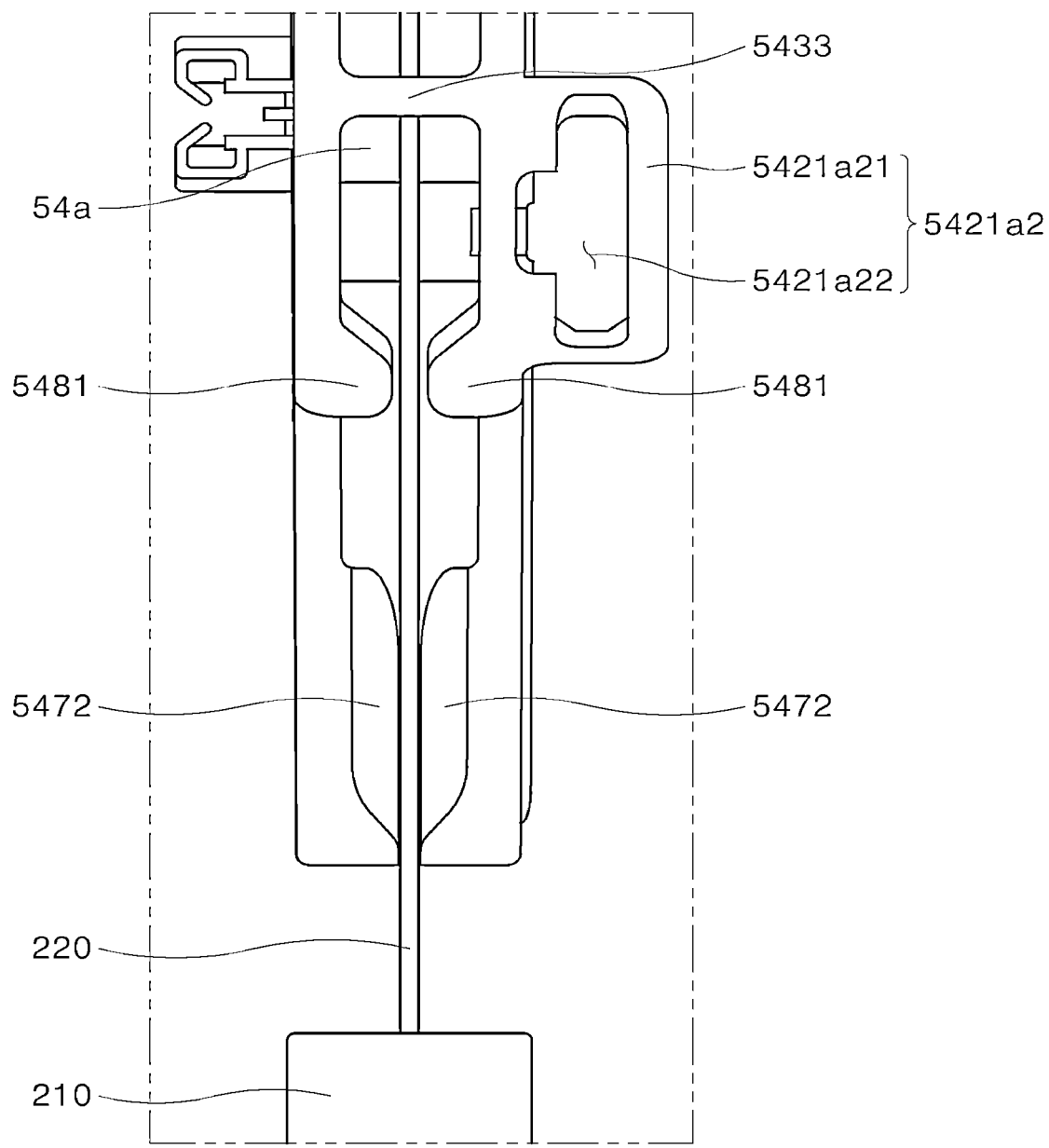
FIG. 11 and FIG. 12 are a plan view and a front perspective view showing a state in which movement of a blade portion of the knife is guided by first and second guides of the knife rack, respectively.
Figure 12:
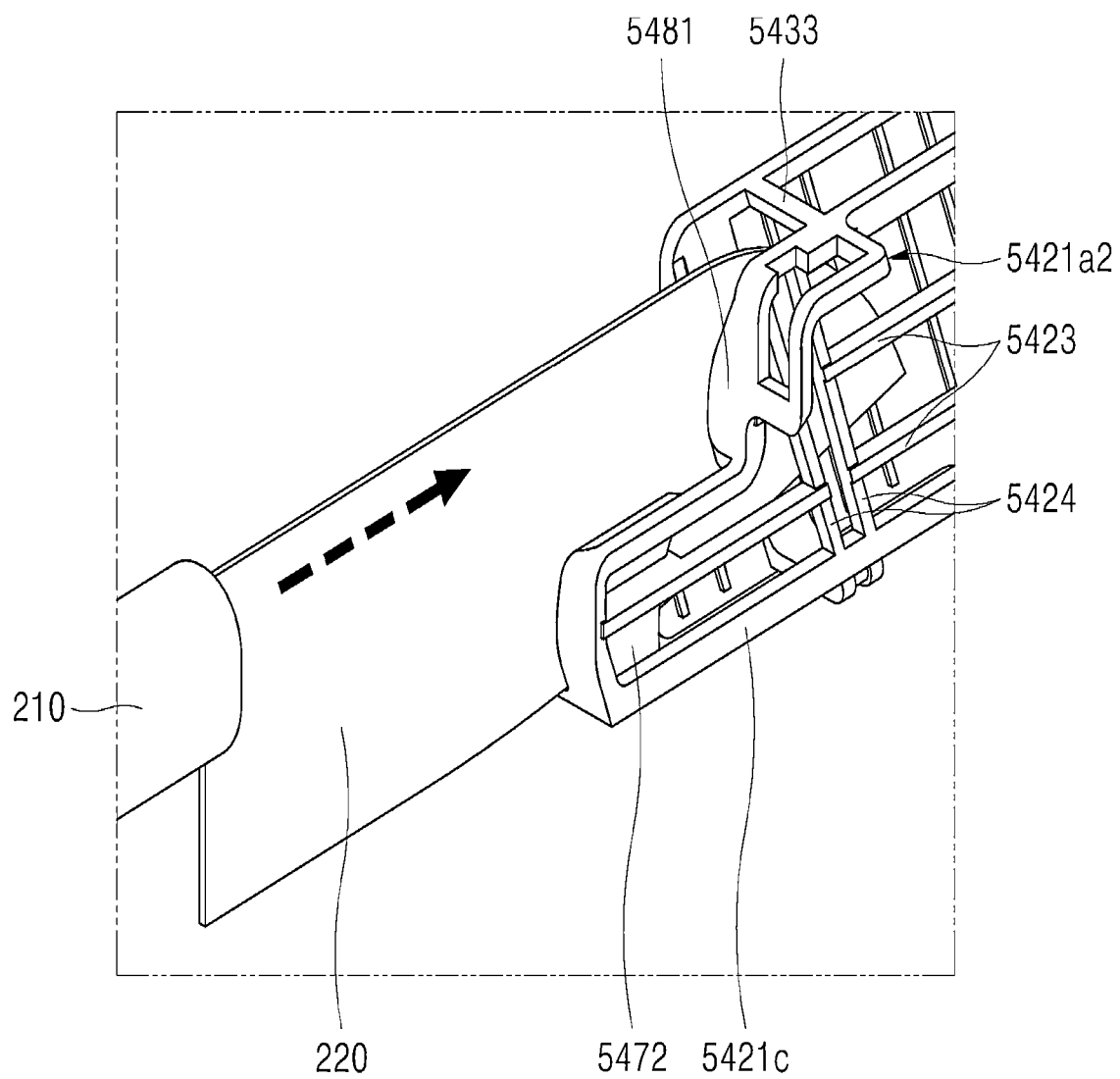

As shown in FIG. 11 and FIG. 12, the user may enter the front end of the blade portion 220 into the rear end of the knife rack 54 as the entrance for the blade portion 220, while holding the handle 210.

While the user stands the blade portion 220 upright, the user horizontally moves horizontally the front end of the blade portion 220 to sequentially pass through the first slot 5473 and the second slot 5482 in a similar manner to a scheme of simply inserting the knife into a sheath, or vertically move the front end of the blade portion 220 to pass through the first slot 5473 and the second slot 5482 at the same time, so that the blade portion 220 may be inserted to partially enter the receiving space 54a.

FIG. 11 and FIG. 12 show a state in which the blade portion 220 has been partially inserted into the receiving space 54a.

The user additionally moves the knife 200 while the blade portion 220 has been partially inserted into the receiving space 54a, such that the center of gravity of the knife 200 is displaced toward the front end beyond the first slot 5473.

When the center of gravity of knife 200 has been displaced beyond the first slot 5473, the knife 200 may slide under its own weight even when the user does not apply an additional force.

This is because, as described above, a sequential arrangement of the rear bridge rib 546, the second lower bridge rib 5442, and the first lower bridge rib 5441 which support the lower end of the blade portion 220 during the sliding movement constitutes a support end having a downward inclination angle a.

However, as described above, the downward inclination angle a may be in the angular range of 10 degrees to 20 degrees. Preferably, the downward inclination angle may have 15 degrees. Thus, the moving speed of the blade portion due to its own weight is not significantly increased.

Furthermore, during the sliding movement of the blade portion 220 due to its own weight, one of both opposing side surfaces of the blade portion 220 may be in contact with the horizontal width constant portion of the first slot 5473 and the horizontal width constant portion of the second slot 5482. Thus, a predetermined friction force may be applied to the blade portion 220 and the first slot 5473 and the second slot 5482, thereby effectively preventing an excessive movement speed of the blade portion from occurring when the blade portion is moving due to its own weight.

Furthermore, at least the horizontal width constant portion of the first slot 5473 and the horizontal width constant portion of the second slot 5482 may extend in a direction that intersects the longitudinal direction of the blade portion 220. Therefore, when the blade portion 220 slides due to its own weight, the blade portion 220 may be effectively prevented from falling down toward the first main body 541 or toward the second main body.

Furthermore, as described above, the first slot 5473 and the second slot 5482 are arranged so as to be spaced apart from each other along the longitudinal direction of the blade portion 220. Thus, when the blade portion 220 has been inserted into both of the first slot 5473 and the first slot 5473, the outer side surface of the blade portion 220 may be parallel to the inner side surface 5411 of the first main body 541 and the inner side surface of the second main body 542, or may define a very small intersection angle relative to the inner side surface 5411 of the first main body 541 and the inner side surface of the second main body 542.

Thus, when the blade portion 220 is inserted into the receiving space, the movement thereof may be guided such that the intersection angle between the longitudinal direction of the blade portion 220 and the longitudinal direction of the receiving space 54a is minimized. Thus, the front end of the blade portion 220 may be effectively prevented from contacting the inner side surface 5411 of the first main body 541 and the inner side surface of the second main body 542.

The sliding movement of the blade portion 220 due to its own weight may be completed upon contact between the second guide surface 5481 formed at the front end 54b2 of the step 54b and the front end of the handle 210.

As shown, the maximum width of the second slot 5482 defined by the second guide surfaces 5481 may be much smaller than a horizontal thickness of the handle 210. Thus, the handle 210 may not pass the second slot 5482 and collide with the second guide surfaces 5481, thereby causing the knife 200 to stop.

In one example, when the insertion of the blade portion has been completed upon the contact between the second guide surface 5481 and the front end of the handle 210, the blade portion 220 may be in an entirely removed state from the first slot 5473 as shown in FIG. 5.

Figure 13:
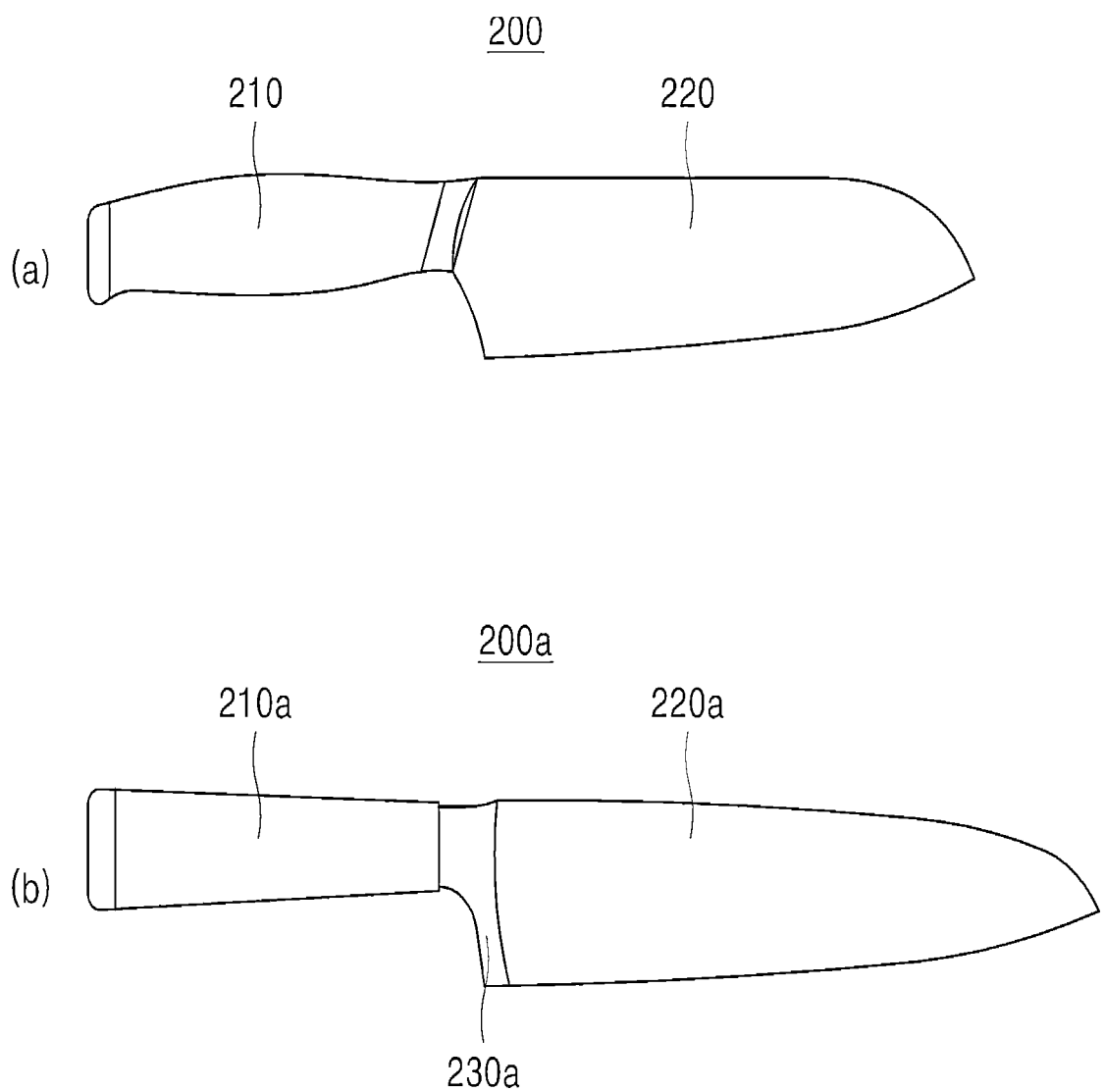
FIG. 13 a-b are diagrams showing examples of knives stored in the knife, wherein shapes of rear ends of blade portions thereof are different from each other.

However, the kitchen knife on the market may include a knife product 200 as shown in (a) in FIG. 13 in which a vertical dimension of the cross section of the blade portion 220 is maintained uniformly as the blade portion extends from the front end toward the handle 210, and a product 200a as shown in (b) in FIG. 13 in which a vertical dimension of the cross section of the blade portion 220a increases as the blade portion extends toward the rear end.

As shown in (b) in FIG. 13, the product 200a has a thicker portion 230a at the rear end of the blade portion 220a to prevent injury to the user. Since the thicker portion 230a has a size at which the thicker portion cannot pass through the first slot 5473, a problem may occur in which the sliding movement due to its own weight as described above is impossible.

Even when the blade portion 220a is provided with the thicker portion 230a, the blade portion 220a should be inserted into the receiving space 54a. To this end, as described above, the first slot 5473 and the rear bridge rib 546 and the second slot 5482 which will be described later may be spaced from each other along the longitudinal direction of the receiving space 54a.

Figure 14:
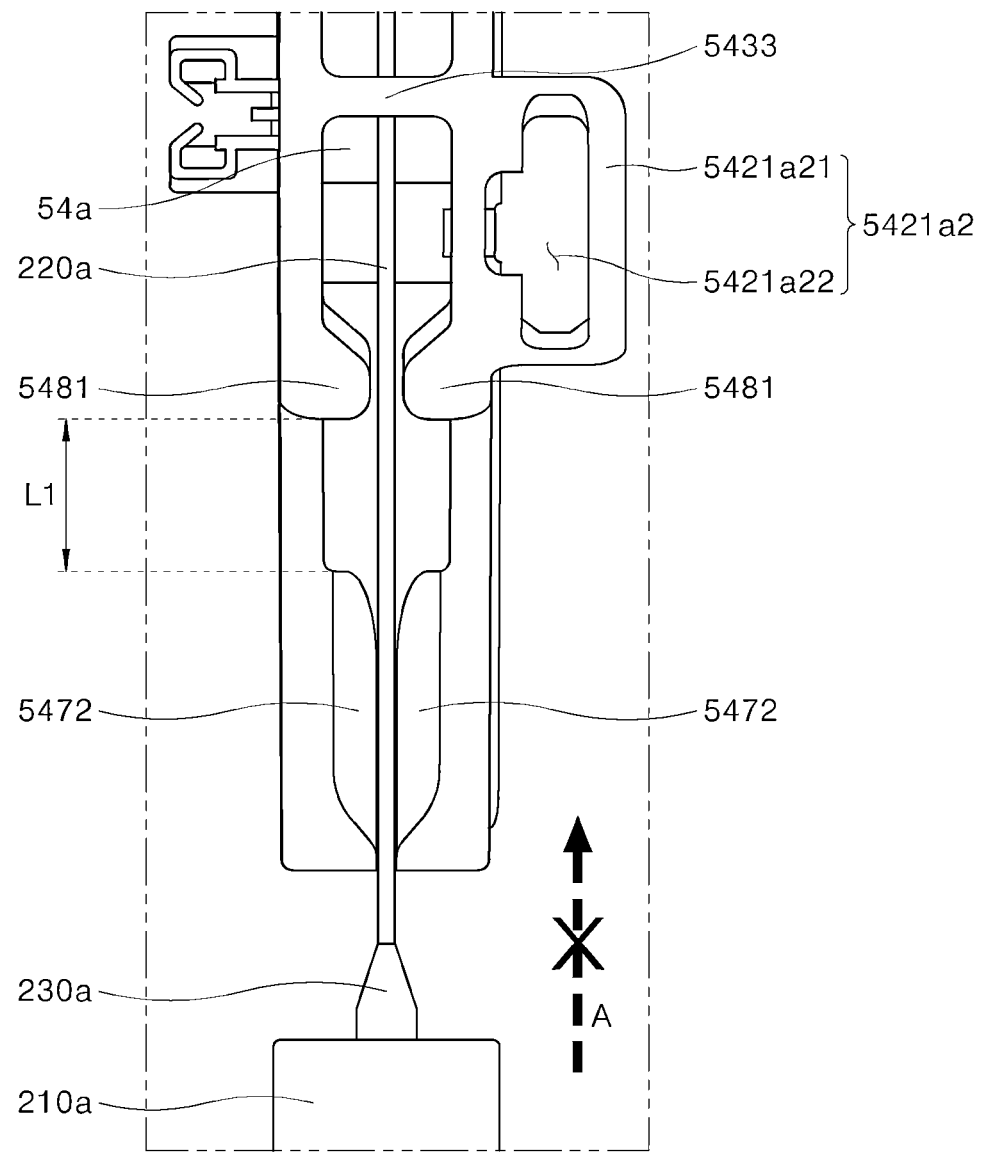
FIG. 14 and FIG. 15 are respectively a plan view and a right side view for illustrating a process of insertion of the blade portion of the knife as shown in FIG. 13 having a thicker portion into the knife rack.

As shown in FIG. 14, a spacing L1 between the front end of the first slot 5473 and the second slot 5482 may be larger than the vertical dimension of the thicker portion 230a.

Furthermore, a portion of the receiving space 54a positioned between the front end of the first slot 5473 and the second slot 5482 may be entirely open downwardly and upwardly.

Figure 15:
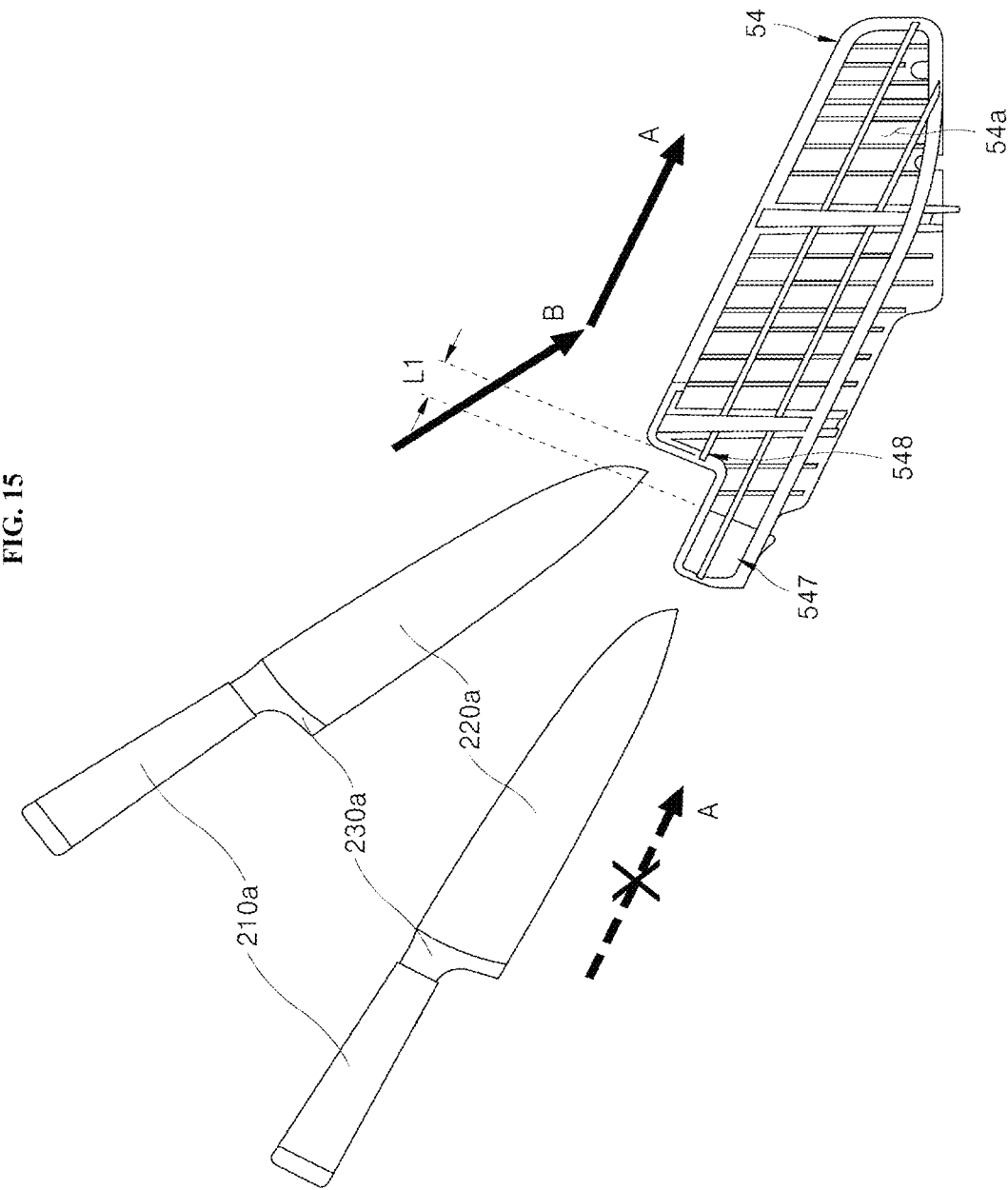

Therefore, as shown in FIG. 15, the thicker portion 230a cannot be inserted into the receiving space 54a via simple slide movement along the longitudinal direction. However, in a state in which the user lifts the handle 210a upwardly, the user may insert the blade portion 220a into the portion of the receiving space 54a positioned between the first slot 5473 and the second slot 5482 and then may pivot downwardly the handle 210a around the tip end of the blade portion and then may pass the thicker portion 230a into the portion of the receiving space between the first slot 5473 and the second slot 5482 corresponding to the spacing L.

Hereinafter, with reference to FIG. 16 to FIG. 18, the configuration of the additional holder 5421a2 and the state in which one blade portion of the scissors is inserted into the additional holder 5421a2 will be described.

As described above, other types of cooking tools, such as scissors, may be heled on the additional holder 5421a2.

The washing of the scissors cannot be performed effectively when the two blade portions of the scissors overlap each other. Thus, as shown in FIG. 17, one of a pair of blade portions 220 constituting the scissors 300 may be heled in the additional holder 5421a2 in a state in which the two blade portions non-overlap each other so that washing thereof may be performed with the washing water.

A first blade portion 311 of the pair of blade portions may be inserted into the through-hole 5421a22 so that the scissors may be held in the non-overlapping state. That is, the first blade portion 311 may be held in an upright state.

Accordingly, a first handle 312 disposed at the rear end of the first blade portion 311 does not pass through the through-hole 5421a22 and may be located at a higher level than that of each of the through-hole 5421a22 and the outward extension portion 5421a21.

As the first blade portion 311 is inserted into the through-hole 5421a22, horizontal removal of the scissors 300 from the additional holder 5421a2 may be prevented.

In one example, a second blade portion 321 among the pair of blade portions 220 may be held on two support ends of the additional holder 5421a2 in a lying state and may be supported thereon against the direction of gravity.

A first support end S1 among the two support ends may be may an upper end surface of the outward extension portion 5421a21 having an inverted L shape and a second support end S2 among the two support ends may be a lower end of the through-hole 5421a22 having the inverted L shape.

Therefore, based on the vertical direction, a vertical level H2 of the first support end S1 may be higher than a vertical level H1 of the second support end S2.

Figure 17:
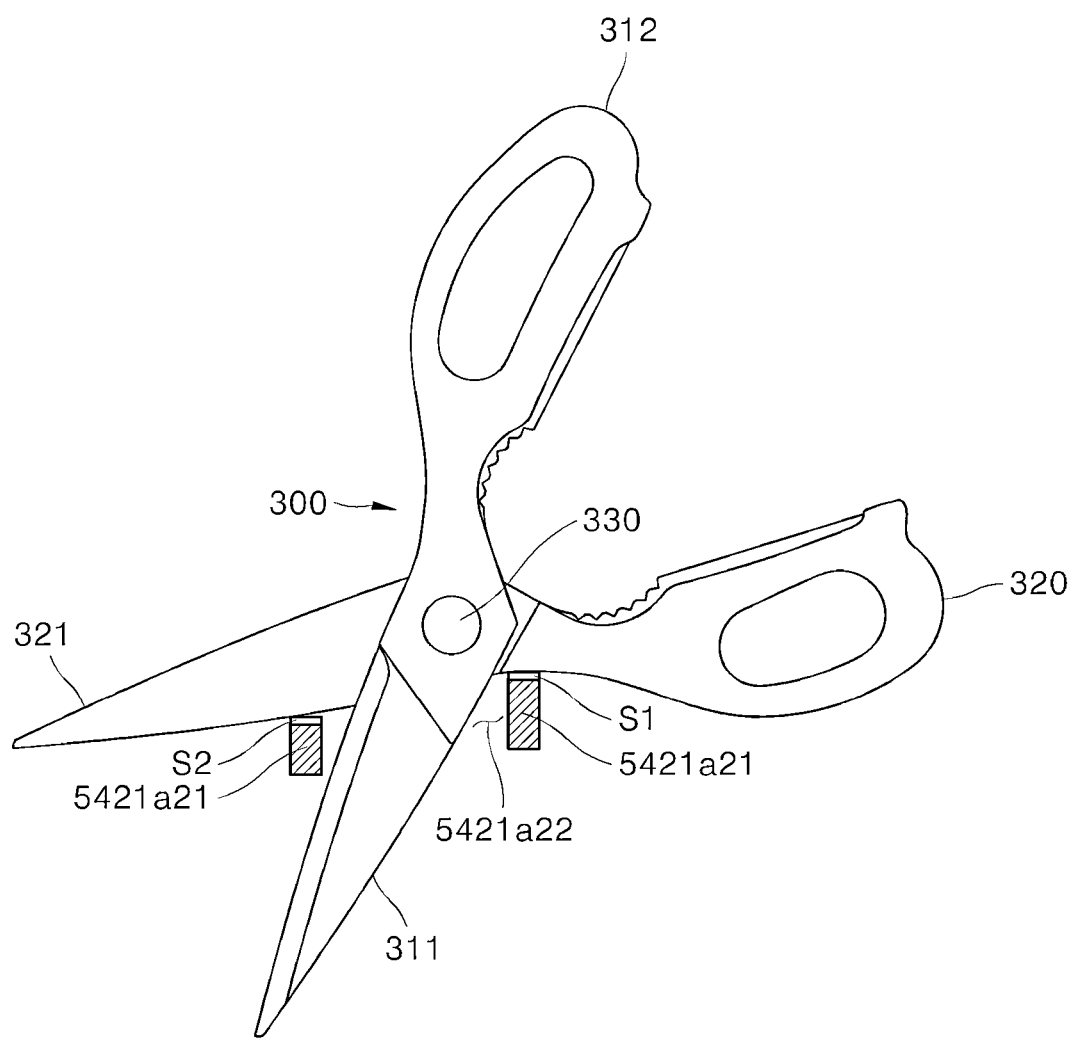
FIG. 17 is a schematic diagram for illustrating a state in which scissors is held in the additional holder in FIG. 16.

As shown in FIG. 17, a portion of the second blade portion 321 in rear of a hinge shaft 330 of the scissors 300 or a second handle 322 may be supported on the first support end S1, and a portion of the second blade portion 321 in front of the hinge shaft 330 of the scissors 300 may be supported on the second support end S2.

Alternatively, unlike what is shown, a portion of the second blade portion 321 in rear of a hinge shaft 330 of the scissors 300 or a second handle 322 may be supported on the second support end S2, and a portion of the second blade portion 321 in front of the hinge shaft 330 of the scissors 300 may be supported on the first support end S1.

In this way, with the two blade portions of the scissors 300 in the non-overlapping state, the first blade portion 311 may be inserted into the through-hole 5421a22, and the second blade portion 321 may be supported on the two support ends, such that the scissors 300 may be effectively supported in a state in which the scissors 300 are effectively prevented from being removed from the holder along the gravitational direction and in the horizontal direction.

Figure 18:
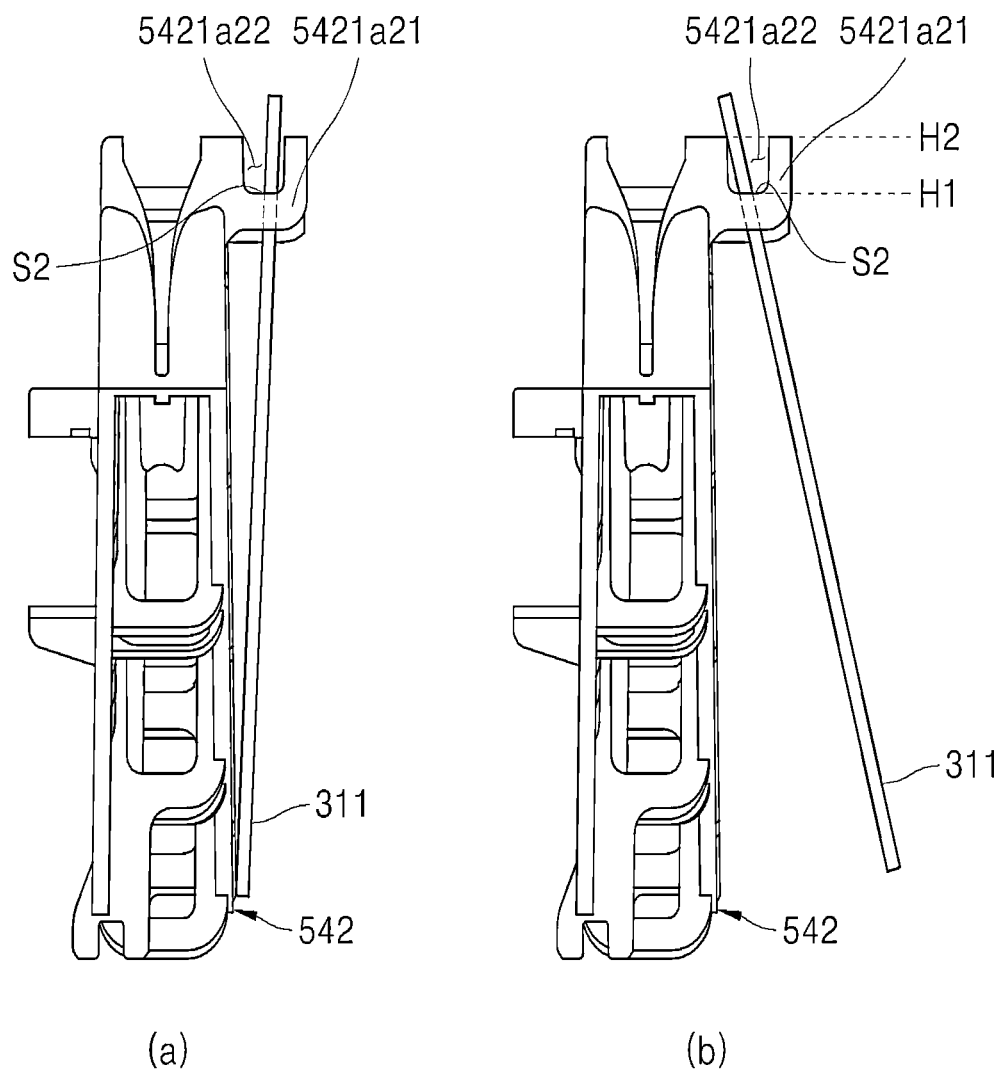
FIG. 18 a-b are front views of the knife rack to illustrate a state in which a rotation range of the scissors is limited when the scissors is held in the additional holder in FIG. 16.
Figure 19:
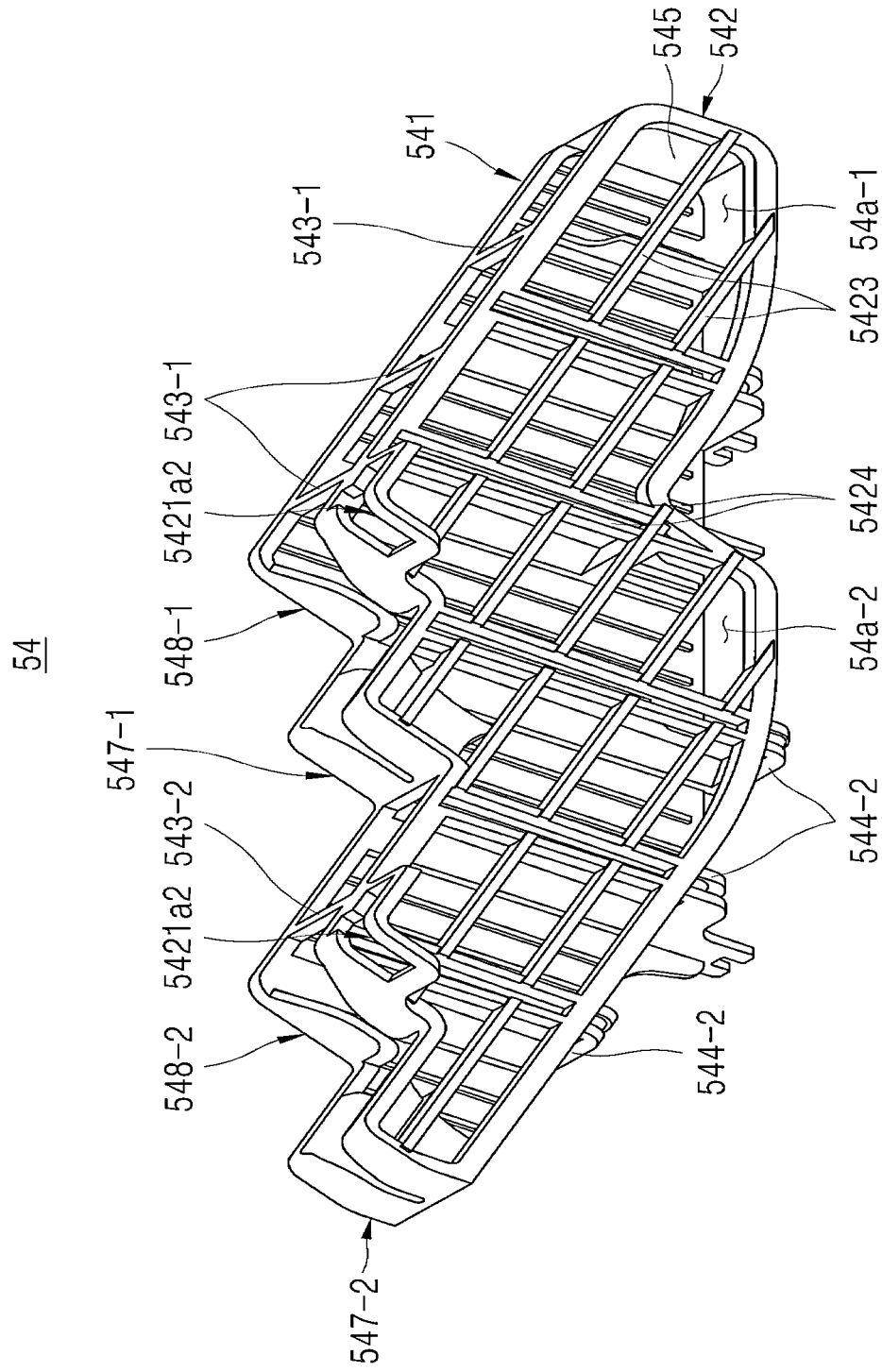
FIG. 19 is a front perspective view for illustrating a configuration of a knife rack with a plurality of receiving spaces so that a plurality of knives may be respectively accommodated in the plurality of receiving spaces according to another embodiment of the present disclosure.
Figure 20:
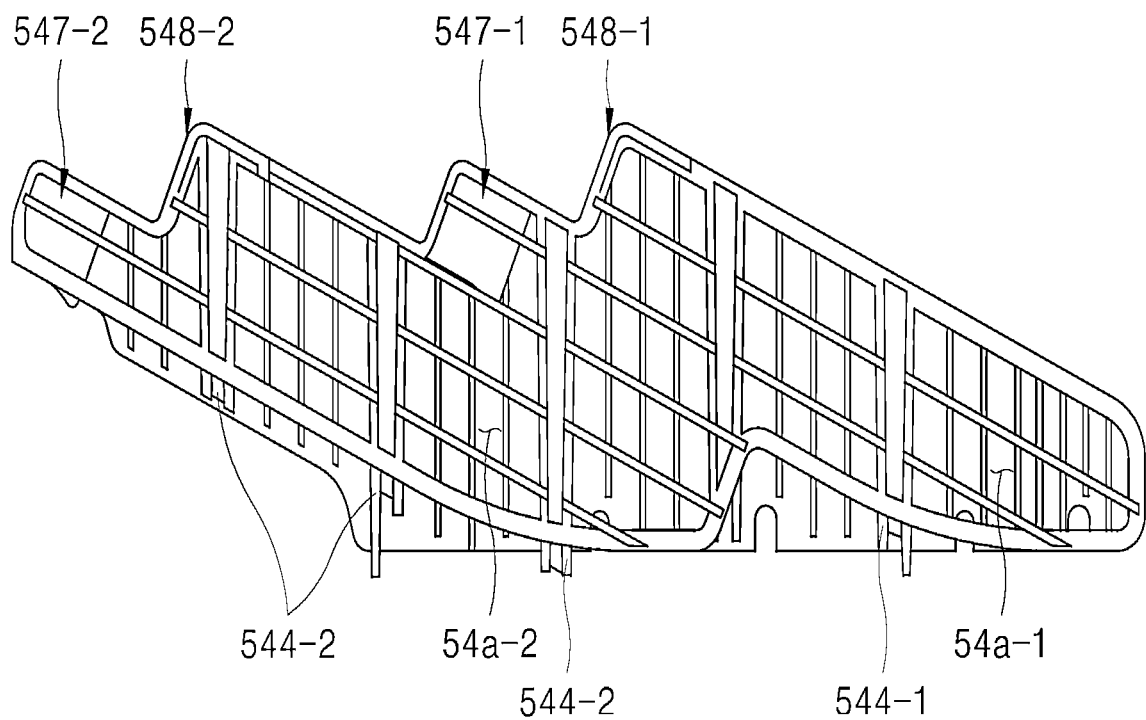
FIG. 20 is a right side view of FIG. 19.
Figure 21:
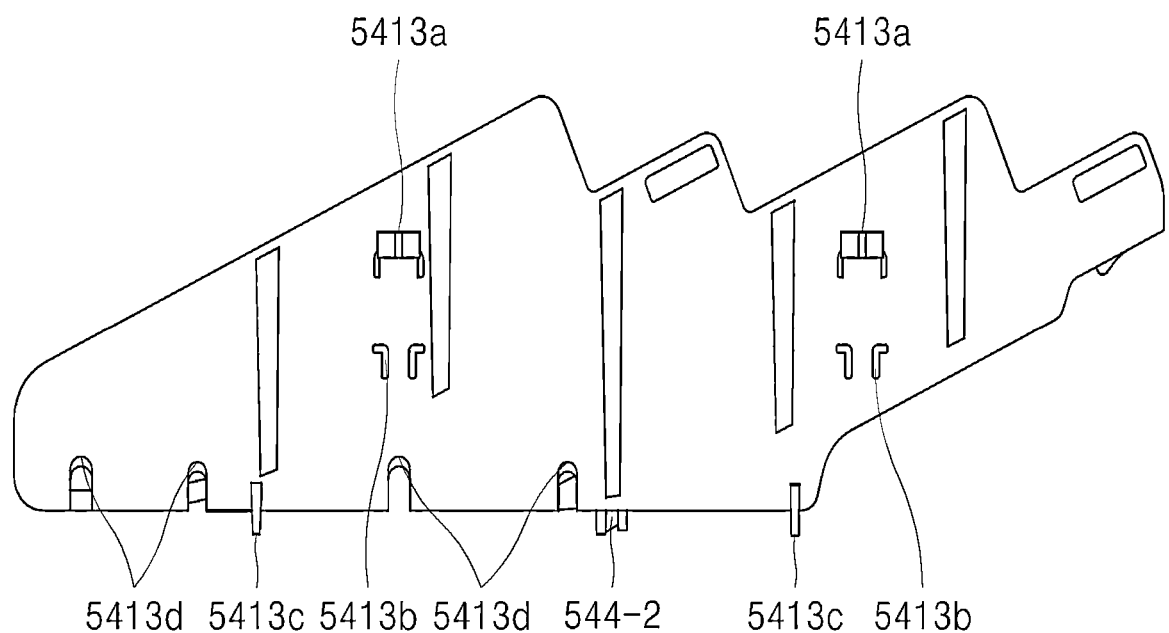
FIG. 21 is a left side view of FIG. 19.

However, as shown in FIG. 18, a horizontal width of the through-hole 5421a22 into which the first blade portion 311 is inserted may be considerably larger than a width of each of the first blade portion 311 and the second blade portion 321 of the scissors 300.

Accordingly, the scissors 300 may be horizontally rotatable about an imaginary axis passing through the first support end S1 and the second support end S2.

However, as shown, the second support end S2 may be the lower end of the through-hole 5421a22 which is positioned at the lowest position based on the vertical direction of the through-hole 5421a22.

Therefore, both side surfaces defining the through-hole 5421a22 connected to the lower end of the through-hole 5421a22 extend upwardly from the lower end. The rotation movement range of the scissors 300 may be limited by these two side surfaces.

That is, as shown in FIG. 18, even when the scissors 300 receive a force or impact such that the first blade portion 311 rotates in a direction away from or toward the second main body 542, the rotation movement range of the second blade portion 321 may be limited by both side surfaces connected to the lower end of the through-hole 5421a22.

In particular, the scissors 300 rotates so that the first blade portion 311 moves toward the second main body 542. In this regard, as shown, in the scissors 300 having the fairly long first blade portion 311 and the fairly long second blade portion 321, the rotation range of the scissors 300 may be additionally limited to a position at which the front end of the first blade portion 311 is in contact with the second main body 542.

Using this structure of the additional holder 5421a2 of limiting the rotation range of the scissors 300, even when the scissors 300 are subjected to rotational force or impact while being held in the additional holder 5421a2, collisions or interference of the scissors 300 with other dishes held in the dish rack and around the knife rack 54 may be minimized.

Hereinafter, with reference to FIG. 19 to FIG. 23, the detailed configuration of the knife rack 54 having a plurality of receiving spaces will be described.

FIG. 1 to FIG. 18 shows an example of the knife rack 54 having a single receiving space 54a that accommodates therein a single knife 200. Alternatively, the knife rack 54 may be constructed so that a plurality of knives may be stored and held therein.

FIG. 19 to FIG. 23 shows an example of the knife rack 54 that may store therein two different knives 200-1 and 200-2. However, embodiments of the present disclosure are not limited thereto, and the number of knives that may be stored therein may increase depending on a size of the lower rack 51 in which the knife rack 54 is accommodated, and a location where the knife rack 54 is installed. In one example, following description is based on the knife rack 54 which may accommodate therein the two knives 200-1 and 200-2, as shown.

The knife rack 54 according to another embodiment of the present disclosure may include a first receiving space 54a-1 and a second receiving space 54a-2 in which the first knife 200-1 and the second knife 200-2 may be accommodated, respectively.

The knife rack 54 having the first receiving space 54a-1 and the second receiving space 54a-2 may be constructed by integrating and unifying the two knife racks 54 respectively having the single receiving spaces 54a as described above with each other.

Accordingly, the basic configuration of the knife rack 54 having the single receiving space 54a may be applied in the same way as described above.

That is, a configuration of each of an upper bridge rib 543-1, a lower bridge rib 544-1, a first rear bridge rib 546-1 defining the first receiving space 54a-1, and a first guide 547-1 and a second guide 548-1 to guide the movement of the first blade portion 220 of the first knife 200-1 may be applied in the same manner as the configuration of each of the corresponding components of the knife rack 54 having the single receiving space 54a.

Furthermore, a configuration of each of a lower bridge rib 544-2 and a second rear bridge rib 546-2 defining the second receiving space 54a-2, and a first guide 547-2 and a second guide 548-2 for guiding the movement of the blade portion 220-2 of the second knife 200-2 may be applied in the same manner as the configuration of each of the corresponding components of the knife rack 54 having the single receiving space 54a.

However, each of the first main body 541 and the second main body 542 may have an integrated structure, and may define both the first receiving space 54a-1 and the second receiving space 54a-2.

Each of the first longitudinal rib 5423 and the transverse rib 5424 included in the second main body 542 and may define both the first receiving space 54a-1 and the second receiving space 54a-2. The mount 5413 may define both the first receiving space 54a-1 and the second receiving space 54a-2. However, in consideration of the increase in the overall size of the knife rack 54, the installation location and the number of the individual components 5413a, 5413b, 5413c, and 5413d that constitute the mount 5413 may be different from those as set forth above.

Figure 22:
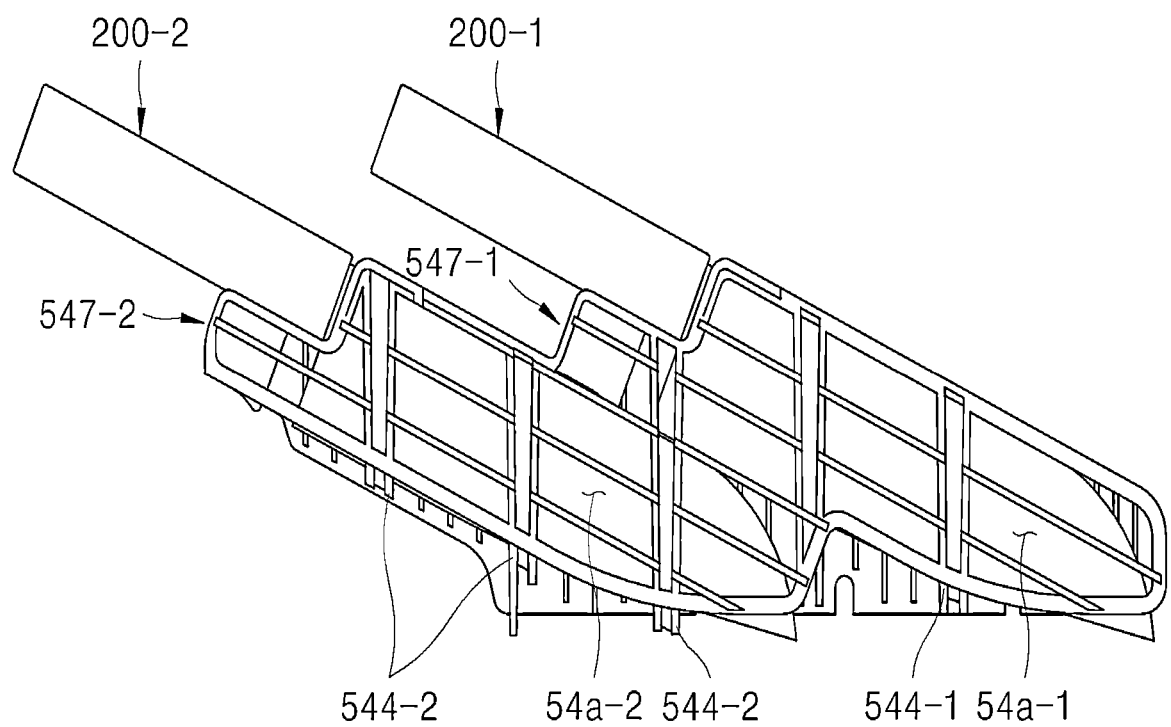
FIG. 22 is a right side view showing two knives held in the knife rack in FIG. 19.
Figure 23:
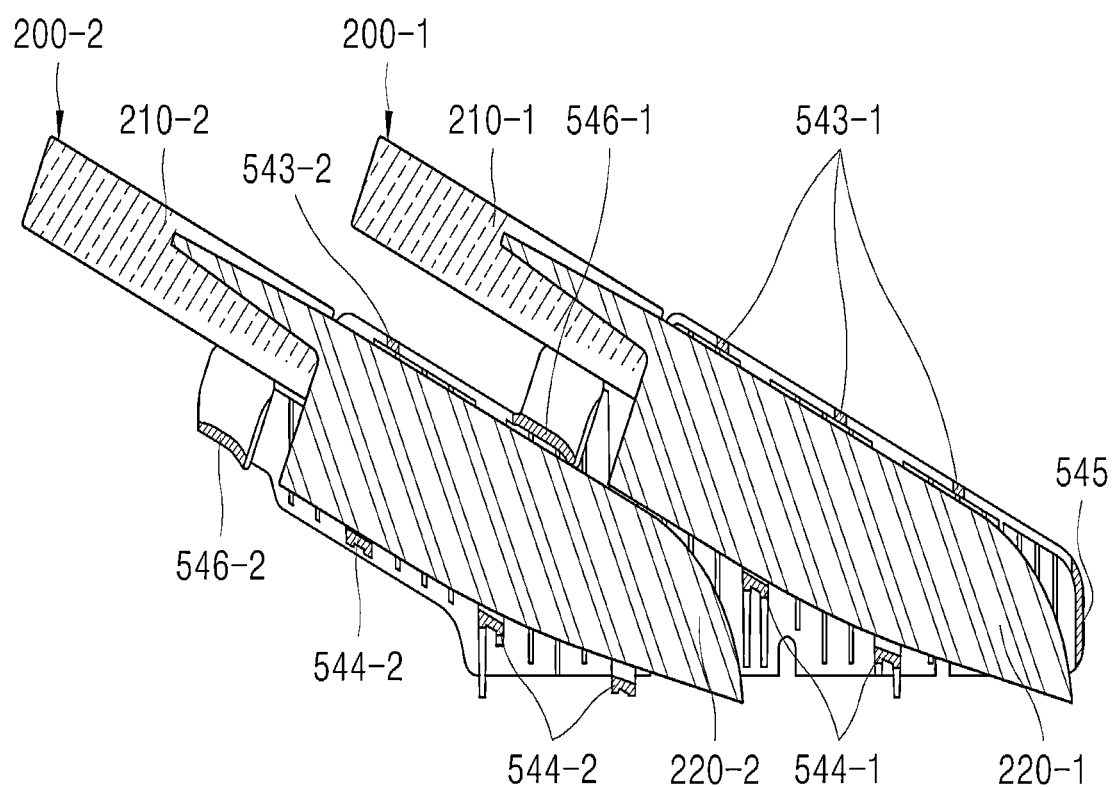
FIG. 23 is a vertical cross-sectional view of FIG. 22.

In one example, as shown in FIG. 22 and FIG. 23, the first receiving space 54a-1 and the second receiving space 54a-2 of the knife rack 54 may be constructed to communicate with each other.

In this regard, the first receiving space 54a-1 and the second receiving space 54a-2 may be sequentially arranged along the longitudinal direction of each of the first knife 200-1 and the second knife 200-2.

Therefore, the first receiving space 54a-1 and the second receiving space 54a-2 may be formed by dividing a single space defined by the first main body 541 and the second main body 542 into two spaces corresponding to the first receiving space 54a-1 and the second receiving space 54a-2.

As shown in FIG. 22 and FIG. 23, the first receiving space 54a-1 and the second receiving space 54a-2 may be distinguished from each other via the lower bridge rib 544-1 and the first rear bridge rib 546-1 defining the first receiving space 54a-1 and supporting a lower end of the blade portion 220-1 of the first knife 200-1.

Similarly to the knife rack 54 having the single receiving space 54a, the lower bridge rib 544-1 and the first rear bridge rib 546-1 of the first receiving space 54a-1 may be arranged linearly in the longitudinal direction of the blade portion 220-1.

In this regard, as shown in FIG. 23, the first rear bridge rib 546-1 which guides the sliding movement of the first knife 200-1 into the first receiving space 54a-1 may also function as a stopper to limit the upward movement range of the second knife 200-2 in a state in which the second knife 200-2 is held in the second receiving space 54a-2.

Accordingly, the first receiving space 54a-1 and the second receiving space 54a-2 may be arranged so as to non-overlap each other in the horizontal direction due to presence of the first rear bridge rib 546-1 and the lower bridge rib 544-1 of the first receiving space 54a-1.

Thus, as shown, the first knife 200-1 and the second knife 200-2 may be received in the first receiving space 54a-1 and the second receiving space 54a-2, respectively, so as not to overlap each other in the horizontal direction, at least such that a portion thereof overlapping each other in the horizontal direction is minimized.

In this way, since at least the portion thereof overlapping each other in the horizontal direction is minimized, the washing water flowing in the horizontal direction through the opening 5422 of the second main body 542 may be scattered evenly toward the blade portion 220-1 of the first knife 200-1 and the blade portion 220-2 of the second knife 200-2.

Therefore, the variation in the washing amount that may occur as the blade portions overlap each other in the horizontal direction as in the prior art may be minimized.

In one example, as shown, the first receiving space 54a-1 and the second receiving space 54a-2 may be arranged to partially overlap each other in the vertical direction.

In this way, the first receiving space 54a-1 and the second receiving space 54a-2 may be arranged along the longitudinal direction of each of the first knife 200-1 and the second knife 200-2, while the first receiving space 54a-1 and the second receiving space 54a-2 may be arranged to partially overlap each other in the vertical direction. Thus, a total length of the knife rack 54 including the first receiving space 54a-1 and the second receiving space 54a-2 may be prevented from being excessively increased, and increase in a space occupancy of the knife rack 54 in the lower rack 51 may be effectively prevented.

Figure 24:
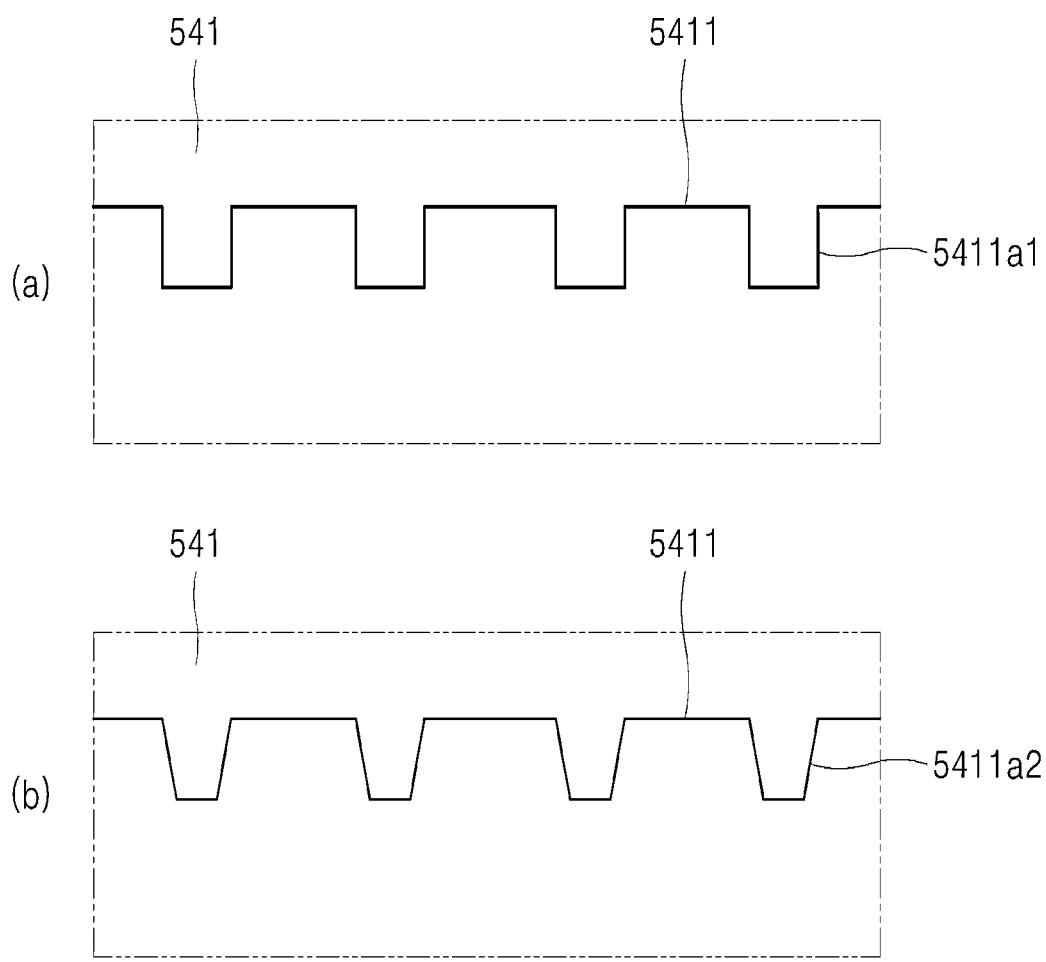
FIG. 24 a-b and FIG. 25 a-c are horizontal cross-sectional views for illustrating a configuration of a scattered reflection inducing portion disposed on an inner side surface of a first main body of the knife rack.
Figure 25:
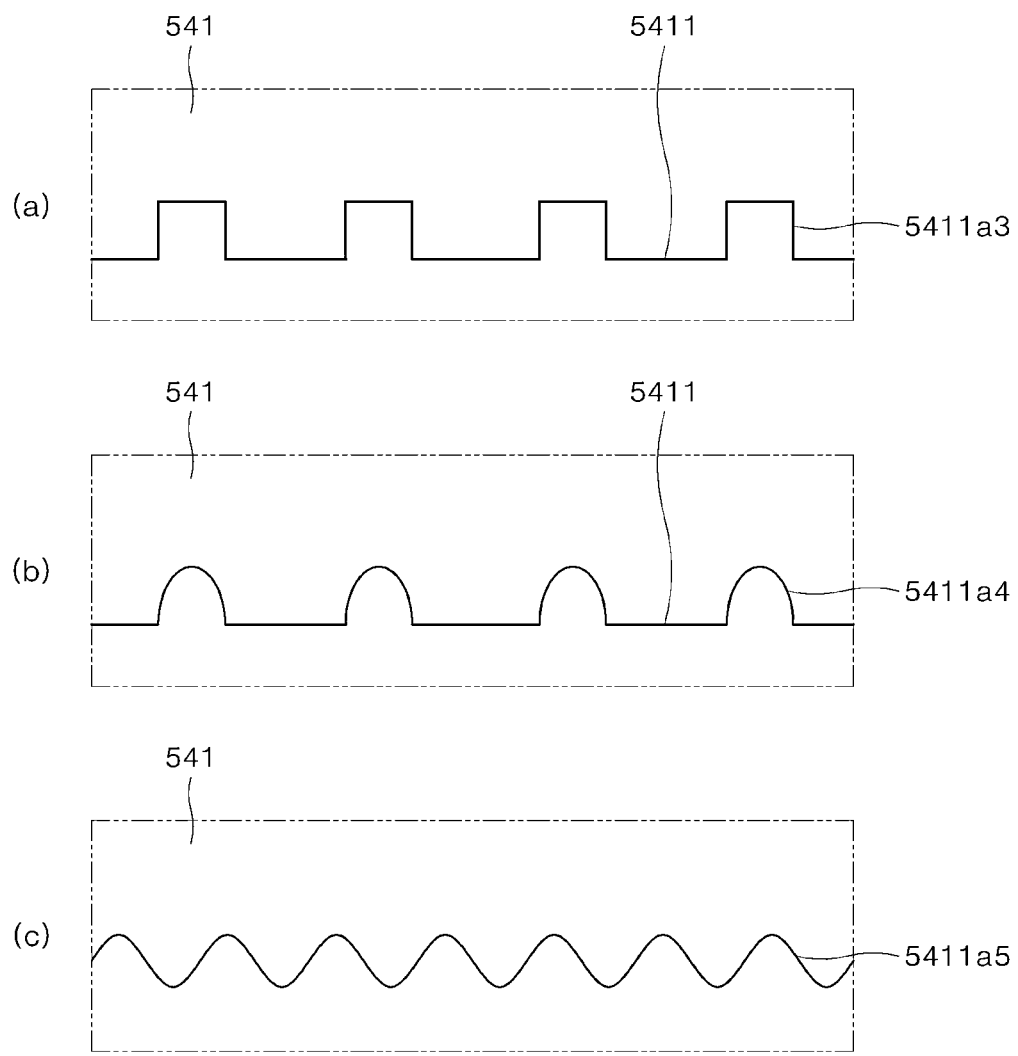

FIG. 24 and FIG. 25 are horizontal cross-sectional views for illustrating a configuration of the scattered reflection inducing portion 5411a disposed on the inner side surface 5411 of the first main body 541 of the knife rack 54.

As described above, the scattered reflection inducing portion 5411a as a means to increase the washing effect on one side surface of the knife 200 by increasing the reflection and scattering effect of the washing water may be formed integrally with the inner side surface 5411 of the first main body 541.

In FIG. 24, in one example, an embodiment in which the scattered reflection inducing portion 5411a includes a plurality of bar-shaped ribs 5411a1 and 5411a2 having an approximately uniform thickness and extending linearly along the vertical direction, and protruding horizontally from the inner side surface 5411 of the first main body 541 is shown.

In this regard, a cross section of each of the bar-shaped ribs 5411*a*1 and 5411*a*2 may be constructed to have a rectangular cross section as shown in (a) in FIG. 24 or a trapezoidal cross section as shown in (b) in FIG. 24. Alternatively, although not shown, a cross section of each of the bar-shaped ribs may be constructed to have a semicircular cross-section.

However, FIG. 24 shows that a horizontal spacing between the bar-shaped ribs and a horizontal dimension of the cross section thereof are equal to each other. However, embodiments of the present disclosure are not limited thereto. Each of the horizontal spacing between the bar-shaped ribs and the horizontal dimension of the cross section thereof may vary based on the shape of the blade portion 220.

For example, an average vertical dimension of the blade portion 220 of the kitchen knife 200 may vary as the blade portion extends along the longitudinal direction thereof. thus, the scattering effect of the washing water may be further increased by decreasing the horizontal dimension (or the horizontal dimension of the cross section) of the bar-shaped rib disposed at a position corresponding to a position where the vertical dimension of the bladder portion 220 is the largest.

In one example, FIG. 25 shows an embodiment in which the scattered reflection inducing portion 5411*a* includes a plurality of bar-shaped grooves 5411*a*3 and 5411*a*4 which extends linearly along the vertical direction and is concavely recessed into the inner side surface 5411 of the first main body 541.

In this regard, the cross section of each of the bar-shaped grooves 5411*a*3 and 5411*a*4 may be constructed to have a rectangular cross section as shown in (a) in FIG. 25 or a trapezoidal cross section as shown in (b) in FIG. 25. Alternatively, although not shown, a cross section of each of the bar-shaped grooves may be constructed to have a semicircular cross-section.

However, FIG. 25 shows that a horizontal spacing between the bar-shaped grooves and a horizontal dimension of the cross section thereof are equal to each other. However, embodiments of the present disclosure are not limited thereto. Each of the horizontal spacing between the bar-shaped grooves and the horizontal dimension of the cross section thereof may vary based on the shape of the blade portion 220.

Furthermore, at a location where contamination of the blade portion 220 is expected to be concentrated or a location where the scattering effect of the washing water should be more concentrated, for example, a rear end area of the blade portion 220 close to the front end of the handle 210, the thickness of the knife 200 rapidly increases. This location may be a location most frequently used for cutting the food.

Thus, in order to concentrate the scattering effect of the washing water on the rear end area of the blade portion 220, the scattered reflection-inducing portion 5411*a* having a wavy cross-section as shown in (c) in FIG. 25 may be disposed at least locally at a location corresponding to the rear end area of the blade portion 220 on the inner side surfaces 5411 of the first main body 541.

Although the embodiments of the present disclosure have been described in more detail with reference to the accompanying drawings, the present disclosure is not necessarily limited to these embodiments, and may be modified in a various manner within the scope of the technical spirit of the present disclosure. Accordingly, the embodiments as disclosed in the present disclosure are intended to describe rather than limit the technical idea of the present disclosure, and the scope of the technical idea of the present disclosure is not limited by these embodiments. Therefore, it should be understood that the embodiments described above are not restrictive but illustrative in all respects. In addition, even though an effect of a configuration of the present disclosure is not explicitly described in describing the embodiment of the present disclosure above, it is obvious that the predictable effect from the configuration should be recognized.

What is claimed is:

1. A dish washer comprising:
a tub having a washing space defined therein and constructed to accommodate therein a dish;
a dish rack constructed to extend from or retract into the washing space, wherein the dish is adapted to be stored in the dish rack; and
a knife rack removably mounted to the dish rack, wherein the knife rack has a receiving space defined therein into which a blade portion of a knife is adapted to be inserted, wherein the knife rack includes:
a first main body defining one side surface of the receiving space;
a second main body defining the other side surface opposite to the one side surface of the receiving space, wherein the second main body is spaced apart from the first main body along a thickness direction of the blade portion; and
a slot into which the blade portion is adapted to be inserted when the blade portion is adapted to be inserted into the receiving space, wherein the slot is configured to guide movement of the blade portion of the knife so that the blade portion does not contact the first main body and the second main body while the blade portion is being inserted into the receiving space, wherein
the slot includes a first slot and a second slot separate from each other and arranged so as to be spaced apart from each other along a longitudinal direction of the blade portion,
a step portion is formed at a rear end of the receiving space into which a front end of the blade portion is adapted to be inserted,
the first slot is defined under a lower end of the step portion, and
the second slot is formed in a front end of the step portion.

2. The dish washer of claim 1, wherein each of the first and second slots extends along a direction intersecting the longitudinal direction of the blade portion.

3. The dish washer of claim 2, wherein each of the first slot and the second slot has a width sized such that the blade portion is adapted to be inserted into each of the first slot and the second slot while a handle of the knife cannot be inserted into each of the first slot and the second slot.

4. The dish washer of claim 2, wherein a portion of the receiving space positioned between the first slot and the second slot is open in both upward and downward directions.

5. The dish washer of claim 2, wherein the first slot is positioned at a lower vertical level than a vertical level of the second slot.

6. The dish washer of claim 5, wherein an upper end of the first slot is open upwardly, while a lower end of the first slot is blocked.

7. The dish washer of claim 2, wherein a length in a longitudinal direction of the blade portion of the first slot is larger than a length in the longitudinal direction of the blade portion of the second slot.

8. The dish washer of claim 1, wherein when insertion of the blade portion into the receiving space has been completed, the handle of the knife is supported on the lower end of the step portion.

9. The dish washer of claim 8, wherein the lower end of the step portion extends linearly along a longitudinal direction of the blade portion.

10. The dish washer of claim 1, wherein the receiving space extends along a direction parallel to a longitudinal direction of the blade portion,
 wherein the blade portion is adapted to be inserted into the receiving space in a direction from a rear end of the receiving space to a front end of the receiving space,
 wherein an extension direction of the receiving space defines a downward inclination angle with respect to the horizontal direction.

11. The dish washer of claim 10, wherein the knife rack further includes a plurality of lower bridge ribs, each having one end connected to the first main body and the other end connected to the second main body,
 wherein the plurality of lower bridge ribs are constructed to prevent the blade portion from moving downwardly in a state in which the blade portion has been adapted to be held in the receiving space,
 wherein the plurality of lower bridge ribs are arranged along the extension direction of the receiving space.

12. The dish washer of claim 10, wherein the knife rack further includes a plurality of upper bridge ribs, each having one end connected to the first main body and the other end connected to the second main body,
 wherein the plurality of upper bridge ribs are constructed to prevent the blade portion from moving upwardly while the blade portion has been adapted to be held in the receiving space,
 wherein the plurality of upper bridge ribs are arranged along the extension direction of the receiving space.

13. The dish washer of claim 12, wherein a shortest distance from the slot to the upper bridge rib closest to the slot among the plurality of upper bridge ribs is smaller than a length of a handle of the knife.

14. The dish washer of claim 1, wherein the knife rack further includes a scattered reflection inducing portion disposed on an inner side surface of the first main body and constructed to scatter washing water flowing into the washing space toward the blade portion.

15. The dish washer of claim 14, wherein the scattered reflection inducing portion includes:
 a plurality of bar-shaped ribs protruding from the inner side surface of the first main body toward the blade portion; and
 a plurality of grooves recessed in the inner side surface of the first main body.

16. The dish washer of claim 1, wherein the knife rack further includes an additional holder protruding from an outer side surface of the second main body so as to extend away from the receiving space,
 wherein one of two blade portions of scissors is adapted to be held in the additional holder in a state in which the two blade portions non-overlap each other.

17. The dish washer of claim 16, wherein the additional holder includes:
 an outward extension portion protruding from the outer side surface of the second main body in an inverted L shape; and
 a through-hole extending through the outward extension portion and extending in an inverted L shape from one end to the other end thereof,
 wherein one of the two blade portions of the scissors is adapted to be inserted into the through-hole and adapted to be held in the additional holder in a state in which the two blade portions non-overlap each other.

18. The dish washer of claim 17, wherein a lower end of the through-hole acts as a first support end adapted to be supporting the other of the pair of blade portions,
 wherein an upper end surface of the outward extension portion acts as a second support end adapted to be supporting the other of the pair of blade portions,
 wherein a vertical level of the first support end is lower than a vertical level of the second support end.

19. The dish washer of claim 1, wherein the receiving space includes:
 a first receiving space for accommodating therein a first knife; and
 a second receiving space communicating with the first receiving space, wherein a second knife is accommodated in the second receiving space,
 wherein the first receiving space and the second receiving space non-overlaps each other in a horizontal direction,
 wherein the first receiving space and the second receiving space partially overlap each other in the vertical direction.

\* \* \* \* \*